US012669930B2

(12) United States Patent
Brocklesby et al.

(10) Patent No.: US 12,669,930 B2
(45) Date of Patent: Jun. 30, 2026

(54) INFORMATION HANDLING SYSTEM TOUCH FUNCTION ROW AT FLEXIBLE DISPLAY FILM FOLDED OVER HINGE

(71) Applicant: Dell Products L.P., Round Rock, TX (US)

(72) Inventors: Brandon J. Brocklesby, Pflugerville, TX (US); Nicholas G. DiLoreto, Georgetown, TX (US); Christopher A. Torres, San Marcos, TX (US); James H. Hallar, Austin, TX (US); Duck-Soo Choi, Georgetown, TX (US); Hsu-Feng Lee, Taipei (TW); Joseph D. McDonald, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/422,305

(22) Filed: Jan. 25, 2024

(65) Prior Publication Data

US 2025/0244870 A1     Jul. 31, 2025

(51) Int. Cl.
*G06F 3/04886*     (2022.01)
*G06F 1/16*     (2006.01)
(Continued)

(52) U.S. Cl.
CPC ........ *G06F 3/04886* (2013.01); *G06F 1/1652* (2013.01); *G06F 3/044* (2013.01);
(Continued)

(58) Field of Classification Search
CPC ....... G06F 3/0488–04886; G06F 3/044; G06F 3/164; G06F 1/1652; G06F 1/1681; G06F 2203/04105; G06F 2203/04108
See application file for complete search history.

(56) References Cited

U.S. PATENT DOCUMENTS 8,674,941 B2     3/2014     Casparian et al.
9,804,733 B2     10/2017     Walline et al.
(Continued)

OTHER PUBLICATIONS

Harding, S., "Review: Dell's XPS 13 Plus pulls high performance from a frustrating design," downloaded from https://arstechnica.com/gadgets/2022/09/review-dells-xps-13-plus-pulls-high-performance-from-a-frustrating-design/ on Jan. 25, 2024, 6 pages.
(Continued)

*Primary Examiner* — David Tung
(74) *Attorney, Agent, or Firm* — Zagorin Cave LLP; Robert W. Holland

(57) ABSTRACT
A portable information handling system includes a touch function row between a keyboard and a display that accepts touches or proximity detection at plural locations to initiate an on-screen-display user interface for a selected of plural functions based upon a touch location. The touch and/or proximity locations may be identified with illumination points and unlabeled as to an associated function since the function associated with a touch and/or proximity location is presented at the display. Alternatively, a flexible display extended from a housing lid portion over a hinge and a part of a housing main portion presents function key images at the touch function row. The on-screen-display user interface presents different control interfaces when touches include multiple fingers and drag versus non-drag inputs.

20 Claims, 22 Drawing Sheets

(51) Int. Cl.
    *G06F 3/044*        (2006.01)
    *G06F 3/16*         (2006.01)

(52) U.S. Cl.
    CPC ............ *G06F 1/1681* (2013.01); *G06F 3/165* (2013.01); *G06F 2203/04105* (2013.01); *G06F 2203/04108* (2013.01)

(56) References Cited

U.S. PATENT DOCUMENTS

| | | | | |
|---|---|---|---|---|
| 10,180,704 | B1 * | 1/2019 | Stewart | G06F 1/1652 |
| 10,331,174 | B2 | 6/2019 | Dreessen et al. | |
| 11,106,314 | B2 | 8/2021 | Krishnakumar et al. | |
| 11,237,598 | B2 | 2/2022 | Seibert et al. | |
| 2009/0315867 | A1 * | 12/2009 | Sakamoto | G06F 3/0488 |
| | | | | 345/184 |
| 2013/0135218 | A1 * | 5/2013 | Jain | G06F 3/0488 |
| | | | | 345/173 |

| | | | | |
|---|---|---|---|---|
| 2016/0132074 | A1 * | 5/2016 | Kim | G06F 1/1652 |
| | | | | 345/173 |
| 2017/0090597 | A1 * | 3/2017 | Silvanto | G06F 3/04886 |
| 2017/0123649 | A1 * | 5/2017 | Clavel | G06F 3/0485 |
| 2017/0308225 | A1 * | 10/2017 | Baek | G06F 3/0482 |
| 2018/0059718 | A1 * | 3/2018 | Ramaswamy | G06F 1/1643 |
| 2018/0068636 | A1 * | 3/2018 | Kim | H01H 13/83 |
| 2018/0113600 | A1 * | 4/2018 | Seymour | G06F 1/1692 |
| 2019/0369797 | A1 * | 12/2019 | Lin | G06F 3/0227 |
| 2022/0342443 | A1 * | 10/2022 | Sepulveda | G06F 3/0412 |

OTHER PUBLICATIONS

Macos User Guide, "Use the Touch Bar on Mac," downloaded from https://support.apple.com/guide/mac-help/use-the-touch-bar-mchlbfd5b039/mac on Jan. 25, 2024, 4 pages.
The Verge, "Dell XPS 13 Plus hands-on: is that . . . a touch bar?," downloaded from https://www.theverge.com/2022/1/4/22865547/dell-xps-13-plus-2022-hands-on-new-design-features on Jan. 25, 2024, 8 pages.

* cited by examiner

INFORMATION
HANDLING SYSTEM
10

HOUSING
LID PORTION
16

DISPLAY
20

12
HOUSING

KEYBOARD
40　MECHANICAL
KEYS
42

HOUSING
COVER
PORTION
36

TOUCH
FUNCTION ROW
44

46

46

TOUCH FUNCTION
LOCATIONS
46

18
HINGE

38
TOUCHPAD

24
CPU

26
RAM

28
SSD

30
EC

GPU

WNIC

22
MOTHERBOARD

32

34

14
HOUSING
MAIN PORTION

12
HOUSING

INFORMATION HANDLING SYSTEM TOUCH FUNCTION ROW AT FLEXIBLE DISPLAY FILM FOLDED OVER HINGE

BACKGROUND OF THE INVENTION

Field of the Invention

The present invention relates in general to the field of portable information handling systems, and more particularly to an information handling system touch function row at flexible display film folded over hinge.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One advantage of convertible information handling system is that they include mechanical keys in the keyboard with vertical travel that provides positive feedback to end users when a key input is made by a key press. Mechanical keys tend to be more user friendly in that end users can type at full speeds similar to when using peripheral keyboards, in contrast with virtual keyboards that are presented at a display as a visual image and that detect inputs with touches to a touch detection screen, such as with a capacitive touch sensor. One technique to improve inputs with virtual keys is to provide haptic feedback when an input is performed, such as by a piezoelectric or other vibration source below the key value on the display. While somewhat helpful, the feedback is generally less useful than that of vertical travel of a mechanical key and sometimes difficult to isolate to a particular location at a keyboard where a key is pressed. A disadvantage of convertible information handling system keyboards is that the size of the keys and the amount of vertical travel are typically reduced due to the small size of the portable housing. This can mean hunting and pecking at keys to perform inputs, particularly with unfamiliar key input values, such as numbers in a number row of a conventional QWERTY keyboard or functions in a function row at the upper top row of keys in a typical information handling system keyboard.

The function row of keys generally has an escape at the far left and then function keys F1 through F12. Some arrangements will have insert and delete keys to the far right, others in smaller sized housings might include fewer function keys, such as F1 through F9. In addition, each function key also can have a toggle or submenu secondary function that is commanded when the function is not selected. For instance, display, keyboard backlight, speaker, microphone and audiovisual controls may be included on function keys. A speaker toggle key might mute and unmute the speaker when the key is pressed. A difficulty with function key interactions is that an end user typically has to hunt and peck for the correct function key by looking at the keyboard and reading the key value from the function keys of the function key row. This tends to introduce inefficiency due to the time needed to find the right key and also due to the attention of the end user being drawn away from displayed visual images, which breaks down user workflow. Often manufacturers will assign input values to keyboards for the function keys so that memorized workflows might fail as an end user moves between different keyboard configurations.

SUMMARY OF THE INVENTION

Therefore, a need has arisen for a system and method which improves usability of function keys at an information handling system keyboard.

In accordance with the present invention, a system and method are provided which substantially reduce the disadvantages and problems associated with previous methods and systems to perform inputs at function keys of an information handling system keyboard. A touch function row couples to a housing main portion cover between a mechanical keyboard and a system display to accept function inputs that are presented in coordination with the display at a touch function on-screen-display user interface.

More specifically, a portable information handling system processes information with a processor and memory that cooperate to execute instructions and present the information as visual images at an integrated display. A keyboard coupled to a housing of the information handling system has mechanical keys that accept end user inputs with vertical travel of mechanical keys. A touch function row couples at the upper side of the keyboard in the place of mechanical function keys and between the keyboard and display. A capacitive touch sensor detects touch locations of the touch function row to accept function inputs and logic of the touch function row presents the function at the display in a touch function on-screen-display user interface to aid end user interactions with and selections of functions key values. In one example embodiment, the touch function row is unlabeled so that end users locate the function key by touching or proximity to the touch function row to present the function key values at the display. Point illumination from LEDs may be included to highlight the touch locations, or alternatively, vertical end lines separate each touch location. In alternative embodiments, touch function row icons with key values are presented by a secondary display included in the touch function row or a foldable display OLED film that extends from the main display across the housing hinge to present function icons at touch locations.

The touch function row accepts end user function inputs in a variety of interactive ways. In one embodiment, a finger touch and slide or proximity slide across the touch function row capacitive touch upper surface generates feedback in the touch function on-screen-display user interface by presenting all of the touch function icons in a row at the bottom of the main display and highlighting the touch function icon for the touch location of the finger as the finger slides along the touch function row. The highlighted touch function icon may be shown as larger than the other icons, in a foreground versus a background for the other icons, with a greater brightness, with a different color or in any manner that shows the end user what function is selected by a press at the current touch location. A selection of the touch function is performed by a lift and tap so that the function at the time of the lift is highlighted and then selected at the tap or a press down to tap from a proximity slide. In one embodiment, a force sensing layer is included with the touch detection surface so that an input is selected with a press down instead of a lift and tap. Presentation of the touch function on-screen-display user interface may be managed with a processing resource dedicated to the touch function row, such as an MCU or a scalar, or can be included in operating system logic, such as when foldable display extends down from the main display to present the icons of the touch function row. The touch function row may also accept gestures, such as two fingers to call up an audio submenu or three fingers to toggle a microphone between mute and unmute. An end user can customize the touch function row by selecting functions to associate with touch locations or defining a macro for a touch location. When an information handling system display includes a touch screen, an end user may make an input by touching directly at the touch function on-screen-display user interface key icons where presented at the touchscreen display.

The present invention provides a number of important technical advantages. One example of an important technical advantage is that a touch function row that detects function key inputs with a touch detection surface replaces mechanical function keys at a keyboard. The function key values are interactively presented at a main display with a touch location highlighted to reinforce end user work flow convenience when interacting with functions since the end can continue to view the display while selecting functions. The function values are configurable so that an end user can adjust the touch function row to perform desired functions. The presentation of configured key input values at the main display or at a display included in the touch function row aids end user recognition of the key value associated with each touch location. Gesture support further simplifies end user interactions and leverages the touch detection capability of the touch function row to increase end user efficiency when selecting function inputs.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system keyboard replaces a function key row with a touch function row to accept configurable function commands with touch inputs supported by an on-screen-display user interface presented at a system display referenceable while using the keyboard. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
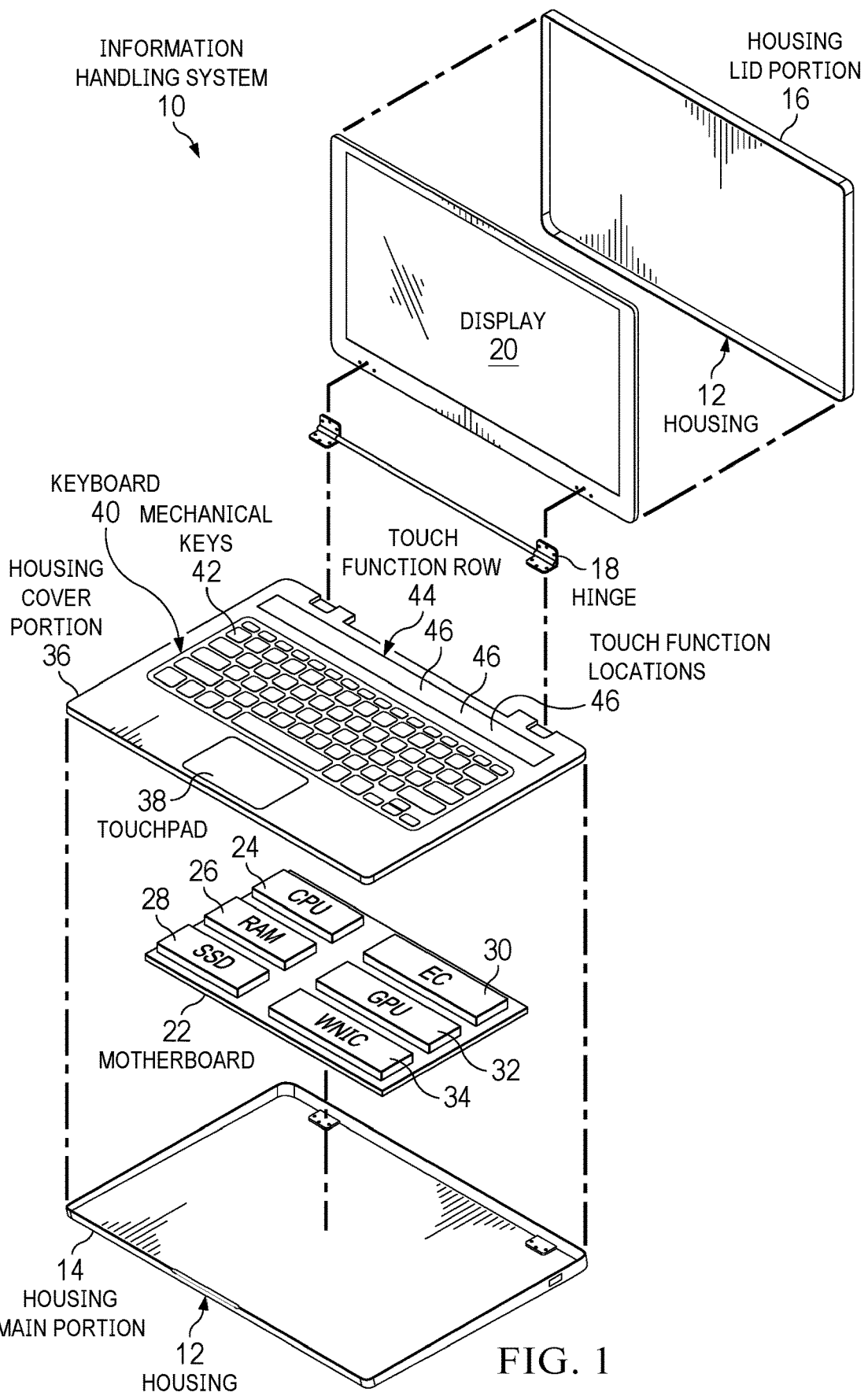
FIG. 1 depicts an exploded perspective view of a portable information handling system having a mechanical function key row of a keyboard replaced by a touch function row that detects function key inputs through touch interactions.

Referring now to FIG. 1, an exploded perspective view depicts a portable information handling system 10 having a mechanical function key row of a keyboard 40 replaced by a touch function row 44 that detects function key inputs through touch interactions. In the example embodiment, information handling system 10 has a portable configuration with housing 12 having a main portion 14 rotationally coupled to a lid portion 16 by a hinge 18 to rotate between open and closed positions. A display 20 couples in lid portion 16 to present visual images, such as a liquid crystal display (LCD) panel or an organic light emitting diode (OLED) film. Housing lid portion 16 rotates to an open position having main portion 14 supporting lid portion 16 with display 20 in a viewing position. Housing main portion 14 includes a motherboard 22 that couples processing components in place to process information. For example, a central processing unit (CPU) 24 executes instructions to process information in cooperation with a random access memory (RAM) 26 that stores the instructions and information. A solid state drive (SSD) 28 provides persistent storage of information and instructions, such as an operating system and applications that are retrieved at power up of the system to RAM 26 by an embedded controller 30. Embedded controller 30 generally manages physical operating conditions within housing 12, such as application of power and maintenance of thermal constraints, and interactions with peripheral devices, such as a keyboard and mouse. A graphics processing unit (GPU) 32 interfaces with CPU 24 to further process information that is presented as visual images at display 20. A wireless network interface controller (WNIC) 34 communicates with external networks and peripherals through wireless signals, such as WIFI and BLUETOOTH. Although the example embodiment depicts a convertible portable information handling system configuration, in alternative embodiments other types of information handling systems may be supported, such as stationary configurations that use a peripheral keyboard.

In the example embodiment, housing 12 includes a cover portion 36 that couples to main portion 14 to cover the processing components. A touchpad 38 and keyboard 40 couple to the upper surface of cover portion 36 to accept end user inputs when housing 12 rotates to an open position. Keyboard 40 has plural mechanical keys 42 that accept end user inputs by a press of an end user finger to depress the key vertically relative to cover portion 36. As an example, mechanical keys 42 are biased upwards by a rubber dome or other biasing mechanism and detect an input when pressed downward to contact a membrane within housing 12. The membrane decodes the position of the contact and reports the mechanical key input to the embedded controller and CPU for use as an end user input. A conventional QWERTY keyboard on a portable information handling system includes a bottom row with a spacebar, three middle rows with letter input values, an upper row with number values that shift to punctuation values, and a far upper function row with function values. A conventional function row includes a far left mechanical escape key, function keys F1 through F12, and far right insert and delete keys. In addition to accepting function inputs when depressed simultaneously with an FN key input on the spacebar row, at least some of the function keys support a secondary input, such as speaker controls, display brightness controls, print controls, etc . . . .

The example embodiment depicts keyboard 40 having mechanical keys of a function row replaced by a touch function row 44 having plural touch function locations 46 that accept function key inputs without a mechanical key. In one embodiment, touch function row 44 is unlabeled so that function inputs are coordinated with a presentation at display 20 when an end user interacts with a capacitive touch detection surface of touch function row 44. In an alternative embodiment, touch locations 46 are identified with light emitting diode illumination to aid end user touch function interactions. Alternatively, a display is placed below the touch detection surface to present the input values represented by each touch location 44. By replacing the standard function row with a generic capacitive touch detection strip, the available functions and their arrangement become flexible and configurable so that an end user can personalize and optimize the available touch functions. Further, gesture and other touch inputs may enhance end user interactions with the touch function row. For instance, sliding an end user finger along the touch function row provides a visual feedback at an on-screen-display user interface presented at display 20 to coordinate function selection, such as by highlighting functions at display 20 as the finger passes by a touch location associated with a function. The touch function row interactions coordinated through display 20 helps to keep an end user's eyes focused on the main display to reduce workflow breaks. Further, traversing options and making selections with gestures, such multiple fingers, swipes and flicks, accomplishes function key selections with rapid and blind interactions along the lines of touchpad and touchscreen interaction models familiar to end users.

In the example embodiment, touch function row 44 couples to housing cover portion 36 between the upper row of mechanical keys and display 20 in lid portion 16. A hardware, embedded code and software architecture coordinates end user function key selection inputs with touches at touch locations and presentation of function key values at display 20 in a touch function on-screen-display user interface. A variety of selection options are available to adapt to end user preferences, such as lift and tap to select a function, a slide to present the on-screen-display user interface, and specific gestures associated with common function key inputs, such as speaker controls and microphone controls. In one embodiment, a long press is recognized to open menus or user interfaces with additional details, such as a pause at a selection that maintains contact for a predetermined amount of time. User configurability through a touch function menu optimizes the touch function row interactions for each end user.

Figure 2:
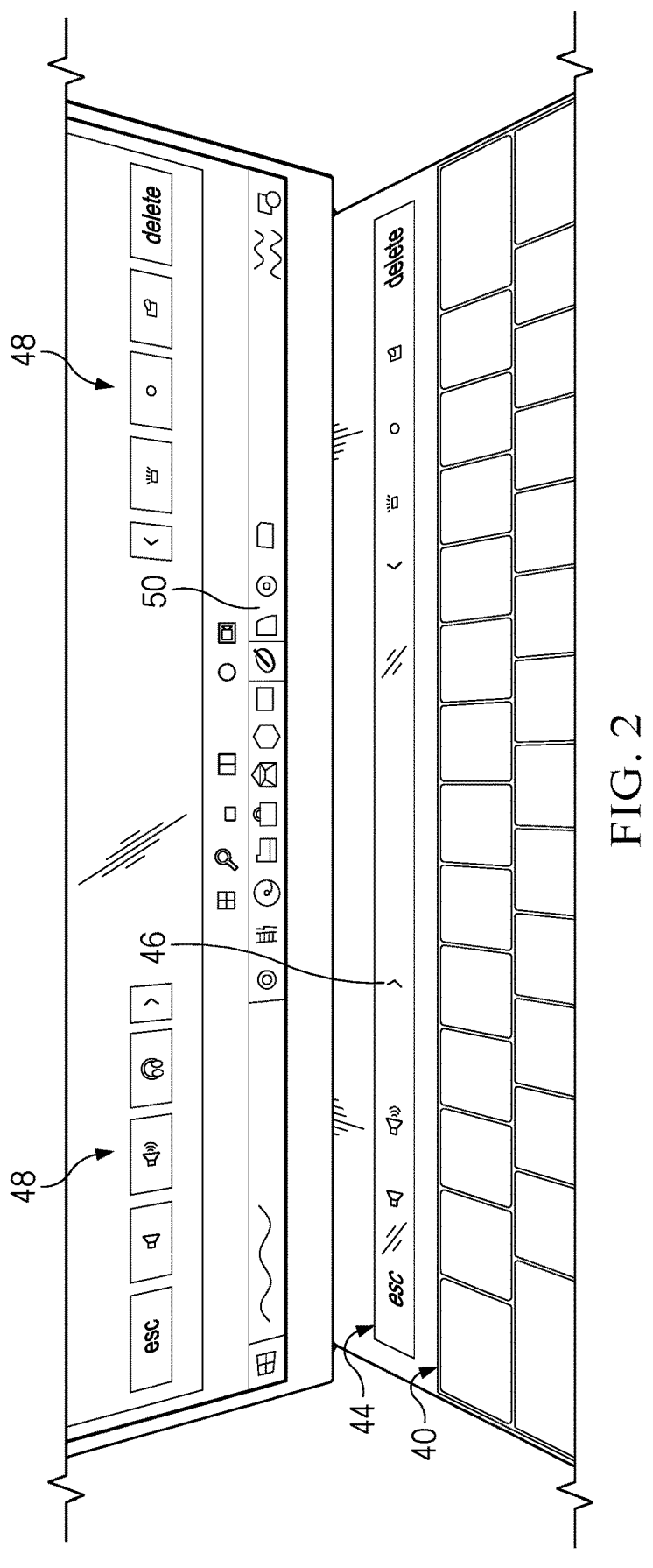
FIG. 2 depicts one example embodiment of a touch function row and touch function on-screen-display user interface.

Referring now to FIG. 2, one example embodiment of a touch function row 44 and touch function on-screen-display user interface 48 is depicted. In the example embodiment, touch function row 44 includes a secondary display (such as the embodiment of FIG. 7 described below) that presents an adaptive and configurable set of function input options, such as an escape key, a speaker control option, a speaker mute option, a brightness option and a delete option. An end user selects the functions that are presented and the order of the functions in a customizable manner. Interactions with touch function row 44 can include a hover option, in which an on-screen-display user interface is activated by a hover and pause, a haptic feedback option, in which inputs are confirmed with a vibration, and a gesture option that can provide shortcuts and automated reconfiguration of the type and order of functions presented. In one example, a task bar 50 may change places with touch function row 44 so that an end user can interact with the touch function row using a mouse or touches at the display and can interact with the task bar 50 through the capacitive touch surface of touch function row 44. In the example embodiment, some or all of the functions available in the touch function row are simultaneously presented at on-screen-display user interface 48. Alternatively, a press at a function location of touch function row 44 activates a function associated with the location or activates an on-screen-display user interface having a submenu for the function. For instance, a press on a speaker or microphone mute icon presentation at touch function row performs the function without further interactions, such as the long press defined above; a press on a speaker icon opens a speaker control menu to adjust volume, balance and other operating conditions. In one embodiment, when a submenu is opened the touch function row becomes a sliding control bar as an input to the function, like changing speaker volume. In another example embodiment, commonly used keys, such as the escape and delete keys, remain presented in the on-screen-display user interface independent of interactions with the touch row function, such as at all times or during times when the task bar is presented.

Figure 3:
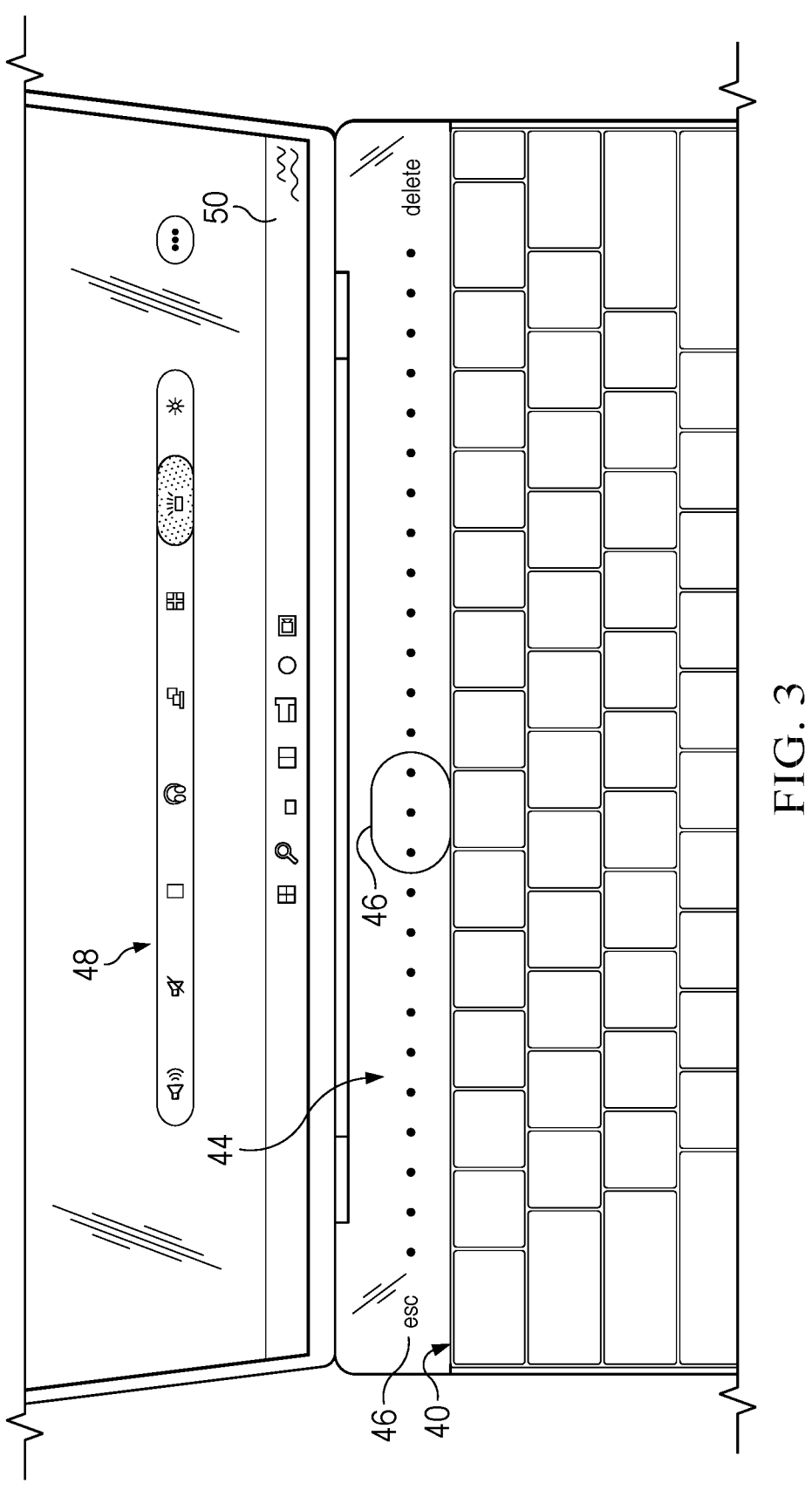
FIG. 3 depicts another example embodiment of a touch function row and touch function on-screen-display user interface.

Referring now to FIG. 3, another example embodiment of a touch function row 44 and touch function on-screen-display user interface 48 is depicted. In the example embodiment, touch function row 44 does not have a display underlying the touch location and instead identifies each touch location with a point light source, such as an LED. The touch locations are fixed in relation to the point light sources and the identification of each touch location function is provided by the touch function on-screen-display user interface 48 when an end user initiates a touch interaction with the touch function row. In the example embodiment, an end user has touched or hovered at a touch location 46 resulting in a speaker control on-screen-display user interface being presented at the display. Further interactions with the speaker controls may be performed by treating the touch function row touch locations as submenu inputs or by interacting directly through the display user interface with a mouse and the operating system. When touch function row 44 designates a submenu selection, the touch locations are reassigned input values to control the submenu instead of the touch functions until the submenu is removed from the display.

Figure 4:
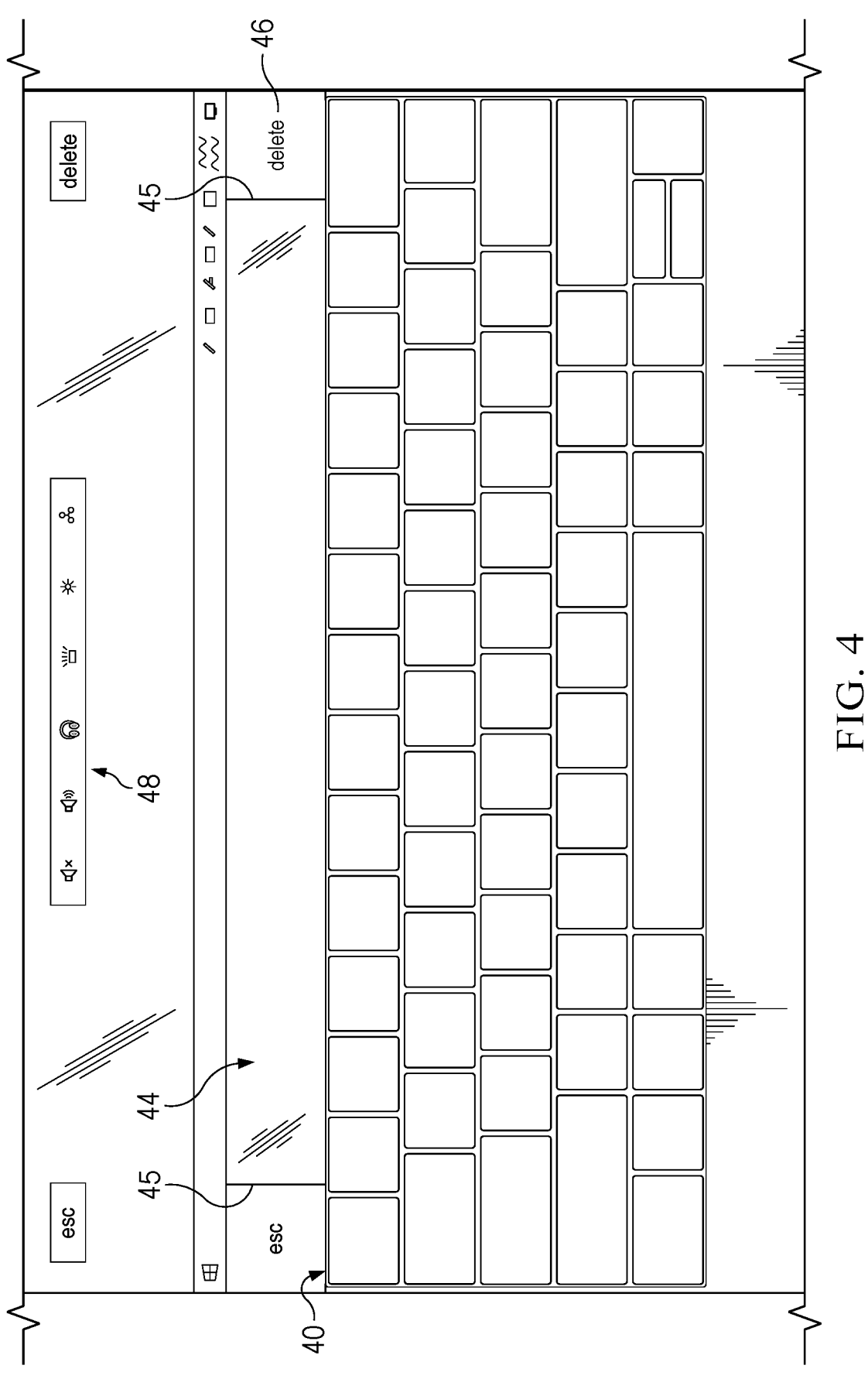
FIG. 4 depicts another example embodiment of a touch function row and touch function on-screen-display user interface.

Referring now to FIG. 4, another example embodiment of a touch function row 44 and touch function on-screen-display user interface 48 is depicted. In the example embodiment, touch function row 44 is a capacitive touch detection surface that is unlabeled so that touch locations are identified by the on-screen-display user interface when a touch is detected at touch detection row 44. In the example embodiment, a vertical line 45 defined with an LED, light guide, or etching, separates the escape and delete keys to help identify the escape key and delete key input touch locations; in an alternative embodiment each of the touch locations may be separated by a similar vertical line. In one example embodiment, a sliding motion along touch function row 44 presents a user interface with all function key inputs displayed and highlighting the function key input most closely located to the touch location. Highlighting of the function key inputs is performed in a variety of ways, such as enlarging a function icon nearest a touch location, showing a different color or transitioning between translucent and fully depicted views. In another example, proximity sensing is applied to initiate presentation of the user interface without a touch at the touch function row, with a pause in movement of a proximity highlighting or selecting the function. In one embodiment, when a function value is highlighted at the display from a pause, a tap initiates the function value. In another embodiment, when sliding touch highlights a function followed by a lift of the finger from the touch function row and a tap at the capacitive surface, the function value is commanded that is highlighted at the time of the lift of the finger.

Figure 5:
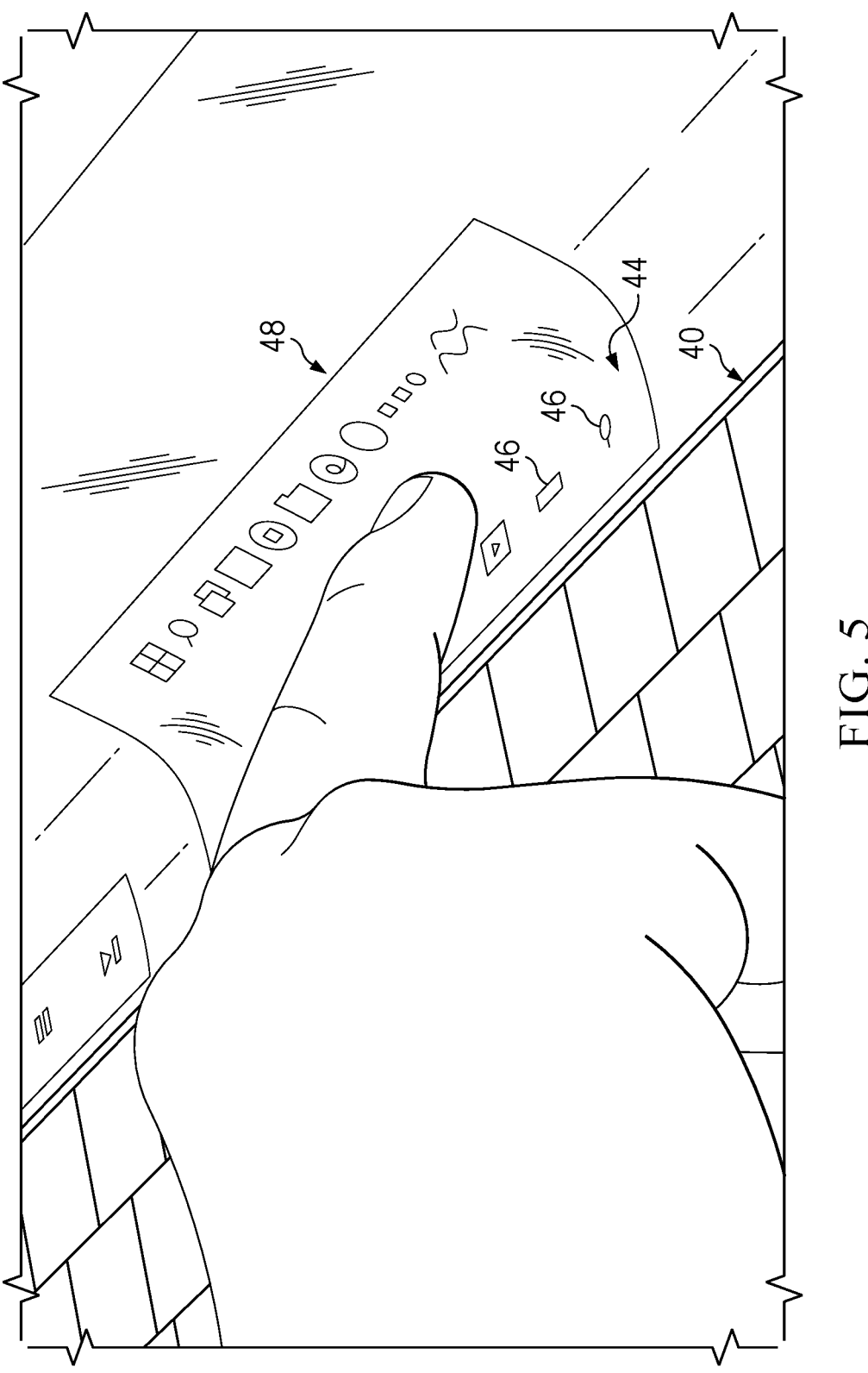
FIG. 5 depicts another example embodiment of a touch function row and touch function on-screen-display user interface.

Referring now to FIG. 5, another example embodiment of a touch function row 44 and touch function on-screen-display user interface 48 is depicted. In the example embodiment, an adaptive touch function row 44 is presented at a bottom portion of a flexible film display 20, such as an OLED film that folds at the housing hinge location so that the touch function row is presented between the keyboard and hinge. The touch locations and touch input values are configurable in content, order and placement. In the example, an end user flicks up with a finger in a gesture that commands a function value at the touch location to present a submenu in the display lid portion location. Including the touch function row in a flexible display enhances configurability, such as by allowing the end user to select any of the display options shown in FIGS. 2, 3 and 4.

Figure 6:
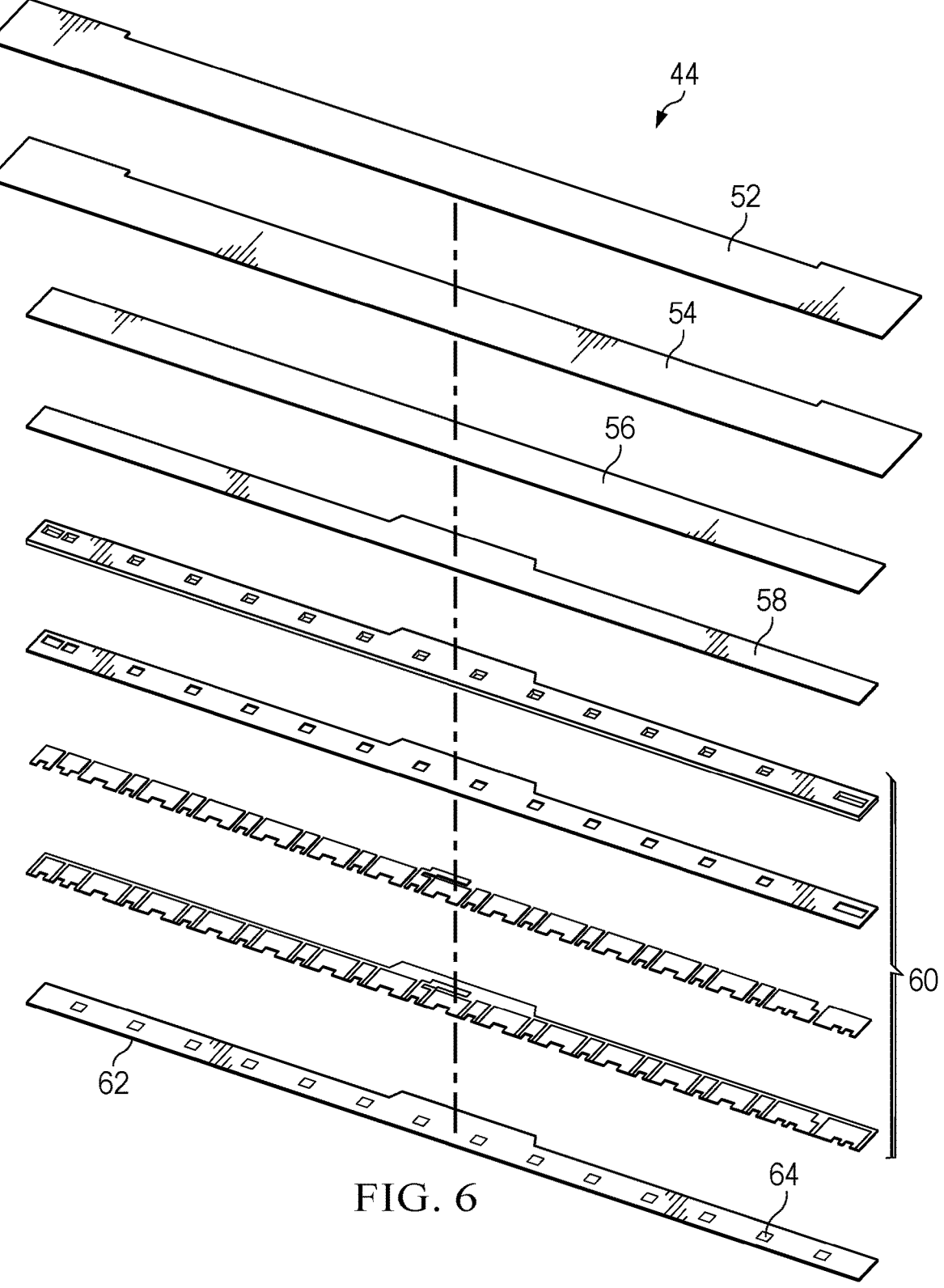
FIG. 6 depicts an exploded perspective view of a touch function row configured to accept touch inputs and force inputs with or without labeling the touch input values of the touch locations.

Referring now to FIG. 6, an exploded perspective view depicts a touch function row 44 configured to accept touch inputs and force inputs with or without labeling the touch input values of the touch locations. In the example embodiment, a cover glass 52 is exposed at an upper surface of the touch function row between a keyboard and display with a label having key values of the touch function row touch locations. In alternative embodiments, cover glass 52 may be unlabeled with a background color to match the system housing. A force sensing membrane 56 couples below cover glass 52 with an adhesive 54 to support sensing of an amount of force applied at touch locations of cover glass 52. Another adhesive layer 58 couples force sensing membrane 56 to a modified lightguide 60 and a printed circuit board 62 having LEDs 64. Printed circuit board 62 includes a processing resource, such as a microcontroller unit (MCU), to detect touches at cover glass 52 and to sense force with force sensing membrane 54. Point illumination provided by LEDs 64 is guided through modified lightguide 60 to identify touch locations at cover glass 52. Touch sensing and proximity sensing may be supported with a capacitive touch sensor included in cover glass 52, force sensing membrane 56 or printed circuit board 62.

The example embodiment of FIG. 6 supports a variety of different and configurable touch function row interactions. As described above, touch function key value selections are made by sliding a finger along cover glass 52 to bring up the touch function on-screen-display user interface, pausing to highlight a desired touch function key value, then lifting and tapping to input the highlighted key value. Force sensing membrane 56 offers an alternative input method of increasing force at a touch location to indicate an input selection. In yet another embodiment, proximity sensing is used to detect a finger in a hover position over cover glass 52 and apply the hover in a similar manner as a touch. An advantage of the hover input is that a transition from hover to touch indicates a touch function value input without a lifting motion. The touch location from the hover position is highlighted at the on-screen-display user interface, by the labels on the cover glass when present, and by the LED illumination point locations. These indications are configurable so that an end user can perform a direct touch without any other indications when desired to have more rapid inputs without the pause associated with presentation of display function input values.

Figure 7:
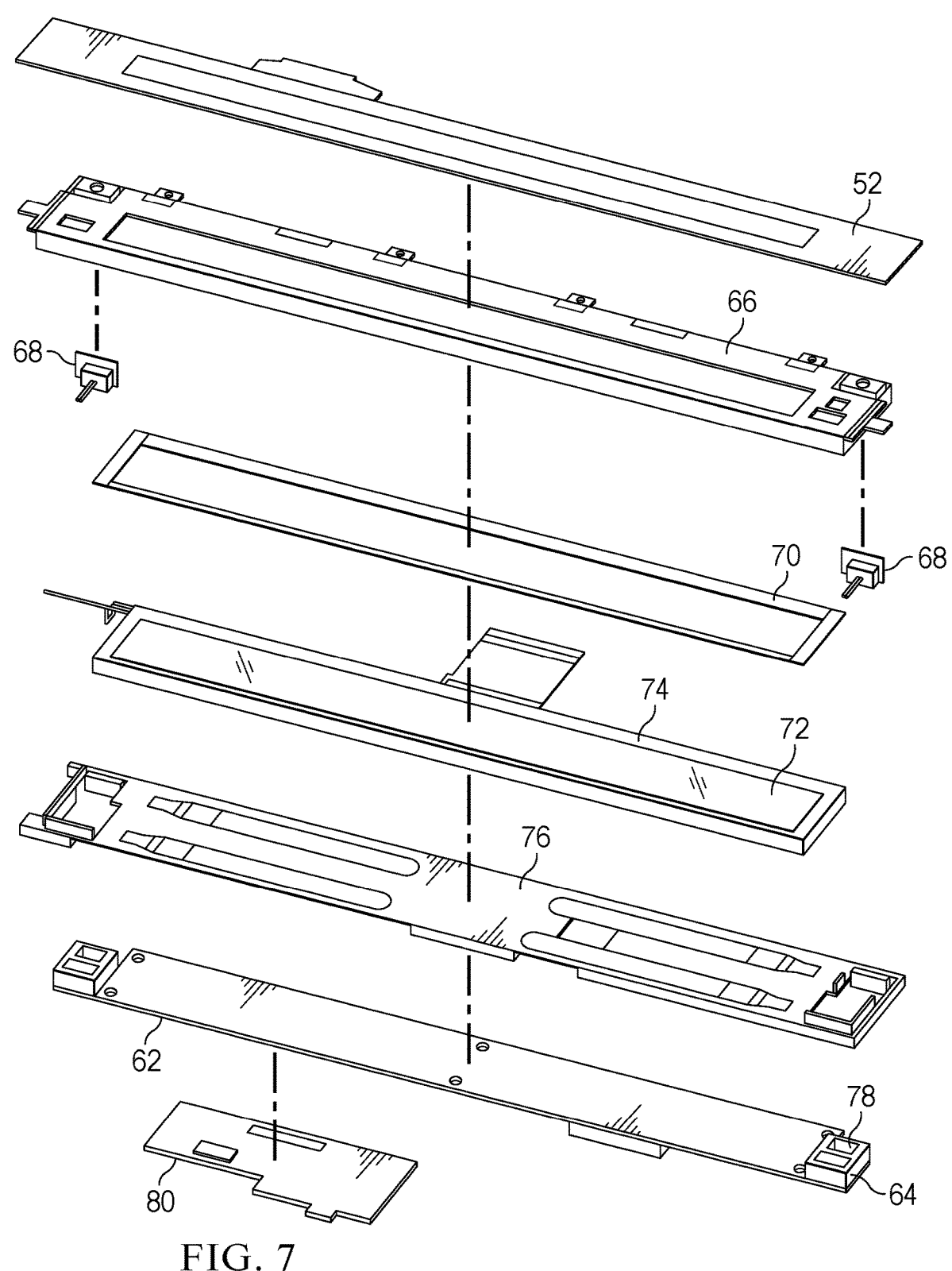
FIG. 7 depicts an exploded perspective view of a touch function row configured to accept touch inputs labeled by a secondary display having configurable touch input values for the touch locations.

Referring now to FIG. 7, an exploded perspective view depicts a touch function row 44 configured to accept touch inputs labeled by a secondary display 72 having configurable touch input values for the touch locations. In the example embodiment, cover glass 52 includes touch sensors, such as embedded wires, and mounts to a cover glass bracket 66 having piezoelectric haptic vibration devices 68 at opposing ends. A foam seal 70 couples the cover glass bracket to a display frame 74 that holds secondary display 72 configured as an LED display panel. The secondary display couples to a subassembly 76, which has printed circuit board 62 coupled at a bottom surface. An ambient light sensor 78 and LEDs 64 couple to the printed circuit board to manage illumination at the LED display panel. A touch sensor control board 80 interfaces with printed circuit board 62 to coordinate presentation of function icons and end user interactions at the LED display panel, as described in greater detail below. An end user configures the touch function row to have desired functionality, which is presented at the LED display panel and detected by the touch sensor in cover glass 52. When function interactions take place, touch sensor control board 80 communicates the interactions through a system embedded controller to the CPU for use in managing physical components and inputs. Haptic devices 68 activate at each input to provide feedback to the end user as inputs are detected and applied. The use of an LCD display panel tends to increase the thickness or Z-height of the solution relative to other solutions, such as the OLED film illustrated in FIG. 8 below.

Figure 8:
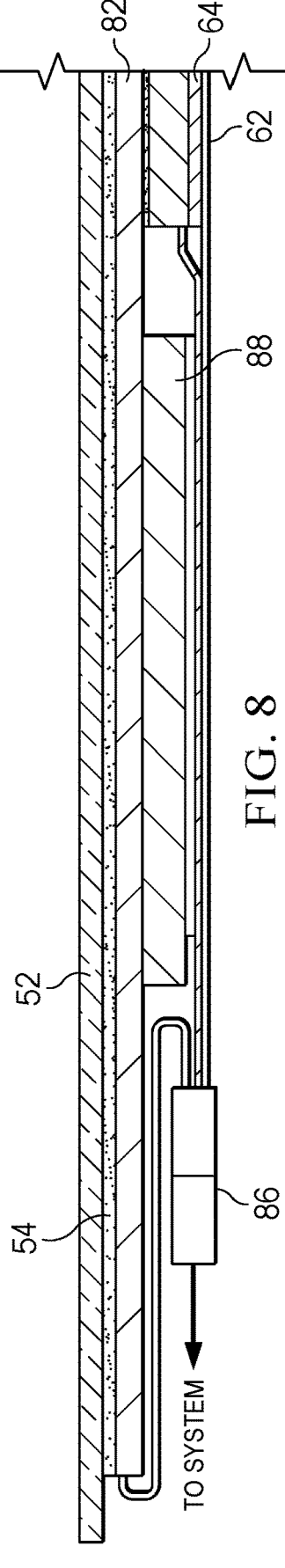
FIG. 8 depicts a side sectional view of the touch function row vertical arrangement of components within an information handling system housing.

Referring now to FIG. 8, a side sectional view of the touch function row depicts the vertical arrangement of the components within an information handling system housing. In the example embodiment, a glass cover 52 couples at an upper surface to an underlying touch sensor 82 with an adhesive 54. OLED film 72 presents touch function row icons as visual images in cooperation with printed circuit board 62, which interfaces through a connector 86 to an information handling system motherboard and embedded controller. In the example embodiment, an escape button 88 is included to manage inputs of the escape function value, such as with a pressure sensor or mechanical button. Maintaining some of the functions as physical keys can help to ensure that an end user has commonly used functions available in defined positions. Other functions remain configurable by changing the positions at which the function icons are presented at the OLED film. One important consideration for the implementation of the touch function row is that the low Z-height of the touch function row adjacent the keyboard rear where thermals exhaust improves thermal rejection, such as with additional exhaust vent structure. The use of an OLED display film over the LCD panel of FIG. 7 helps to drive a low Z-height with improved thermal management.

Figure 9:
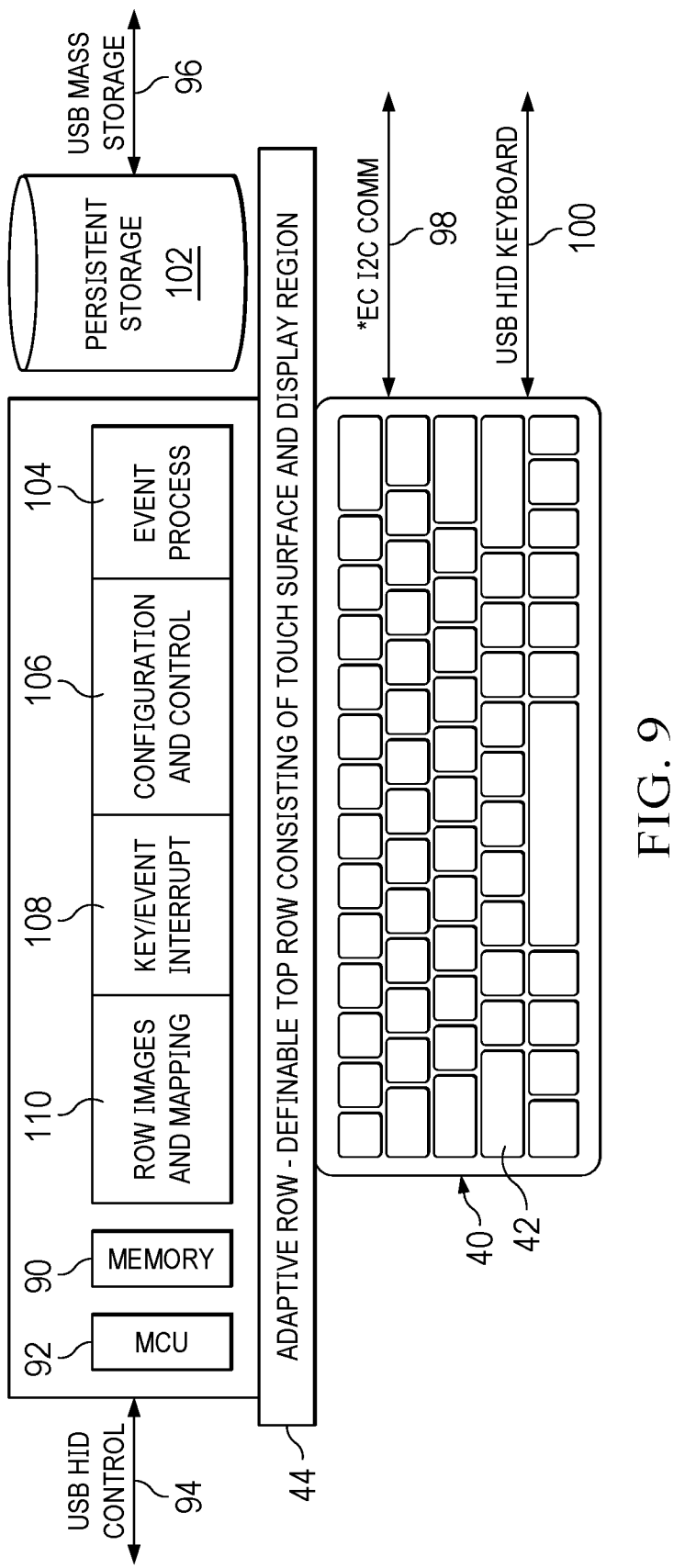
FIG. 9 depicts a block diagram of logical elements that coordinate interactions of an end user at a touch function row.

Referring now to FIG. 9, a block diagram depicts logical elements that coordinate interactions of an end user at a touch function row. In the example embodiment, touch function row 44 stores instructions in a non-transitory memory 90 that execute on a processing resource 92, such as an MCU. Touch function row 44 processing resource 92 interfaces with a system motherboard through a USB HID control interface 94 and with a mass storage, such as an SSD, through a USB mass storage interface 96. In alternative embodiments, other types of interfaces may be used. Keyboard 40 includes mechanical keys 42 that accept end user touch inputs with a vertical movement while touch function row 44 is a flat capacitive touch surface that detects touches at touch locations. Keyboard 40 communicates key inputs through a conventional interface, such as an embedded controller I2C interface 98 or a USB HID keyboard interface 100. Keyboard 40 may be integrated in a portable information handling system housing as described above or in a peripheral keyboard that operates separate from an information handling system housing. A row images and mapping module 110 arranges presentation of function icons, such as key values for the function key row, and maps the presentation of the function icon locations to the touch function row touch locations. A key/event interrupt module 108 monitors the touch sensor to detect when a touch event takes place and provides the event information to the row image and mapping module to execute. A configuration and control module 106 manages the order and list of functions presented at the touch function row, such as based on end user preferences and context of the operating conditions. An event process module 104 executes to handle events as detected according to the mapped positions and configuration.

In the example embodiment, configuration and control module 106 accesses available touch function row configurations stored in persistent storage 102 to define a mapping of touch locations to functions for presentation at the touch function row display and system display. For example, a table of available functions is presented along with a list of functions assigned to touch locations. The end user can then drag and drop desired functions from the list of available functions to touch locations defined on the touch function row. The available function may include the standard function keys, such as escape, insert, delete and F1 through F12, presented in any order desired by the end user. Secondary functions that are typically shown above F1 through F12 keys may also be included in any desired order independent of the values F1 through F12. Some of the function keys may result in a command directly issued to the system, such as a mute of a speaker or microphone. Others may result in opening of a submenu that presents control inputs, such as an audio speaker control function that opens a menu on the main display to control speaker volume, balance and quality. In some instances, a function command may open a submenu to show the value selected by the input, such as a volume bar that shows a volume level when increased by a volume up function key. In one embodiment, a macro arrangement allows an end user to define and customize customs that are assignable to the function keys, such as to support applications running on the system.

Figure 10:
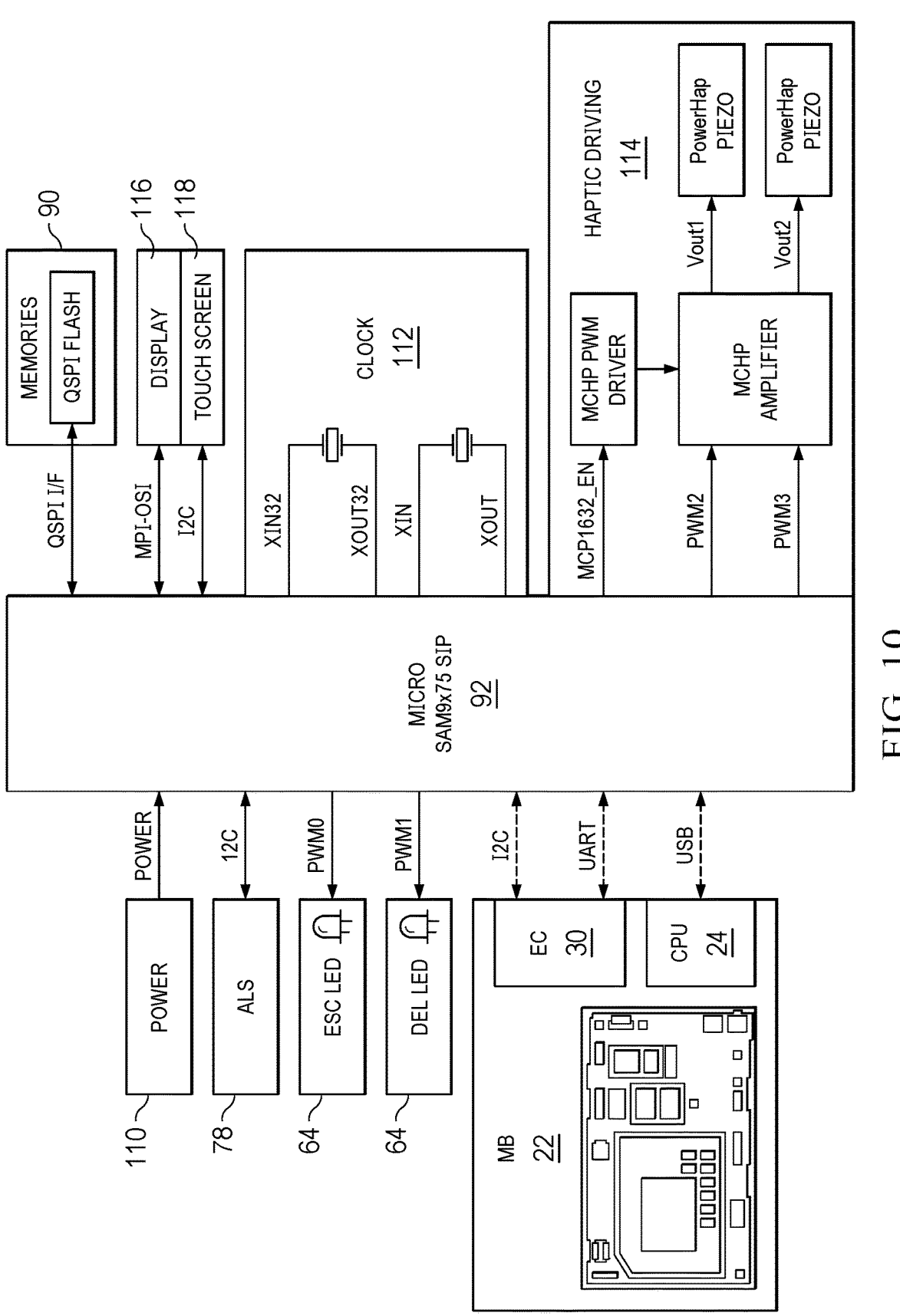
FIG. 10 depicts an example hardware components that cooperate to support touch function row interactions.

Referring now to FIG. 10, an example embodiment depicts hardware components that cooperate to support touch function row interactions. Motherboard 22 supports execution of an operating system and application on CPU 24 under management of an embedded controller 30. CPU 24 and embedded controller 30 interface with touch function row processing resource 92 through I2C, UART, USB and similar interfaces operating with a clock 112. In the example embodiment touch function row 44 has a SAM9x75 MCU as the processing resource 92 that receives power from a power source 110 and executes instructions stored in a flash memory 90. Processing resource 92 interfaces with display 116, such as an OLED film included in the touch function row, to present function icons as defined by the configuration selected by an end user. A touch detection surface 118 detects touch locations, and processing resource 92 initiates haptic feedback from a haptic device 114 as defined by the configuration settings when a touch input is detected. ALS 78 detects ambient light at the touch function row to adjust brightness of display 116. In the example embodiment, a point illumination LED 64 indicates a fixed location for the escape and delete keys. In one example embodiment, processing resource 92 supports presentation of touch functions at both the secondary display included in the touch function row and in the primary system display. For instance, the processing resource supports function interactions at the main system display in preboot operations to fully interact with an end user who has a need of functions before system boot.

Figure 11:
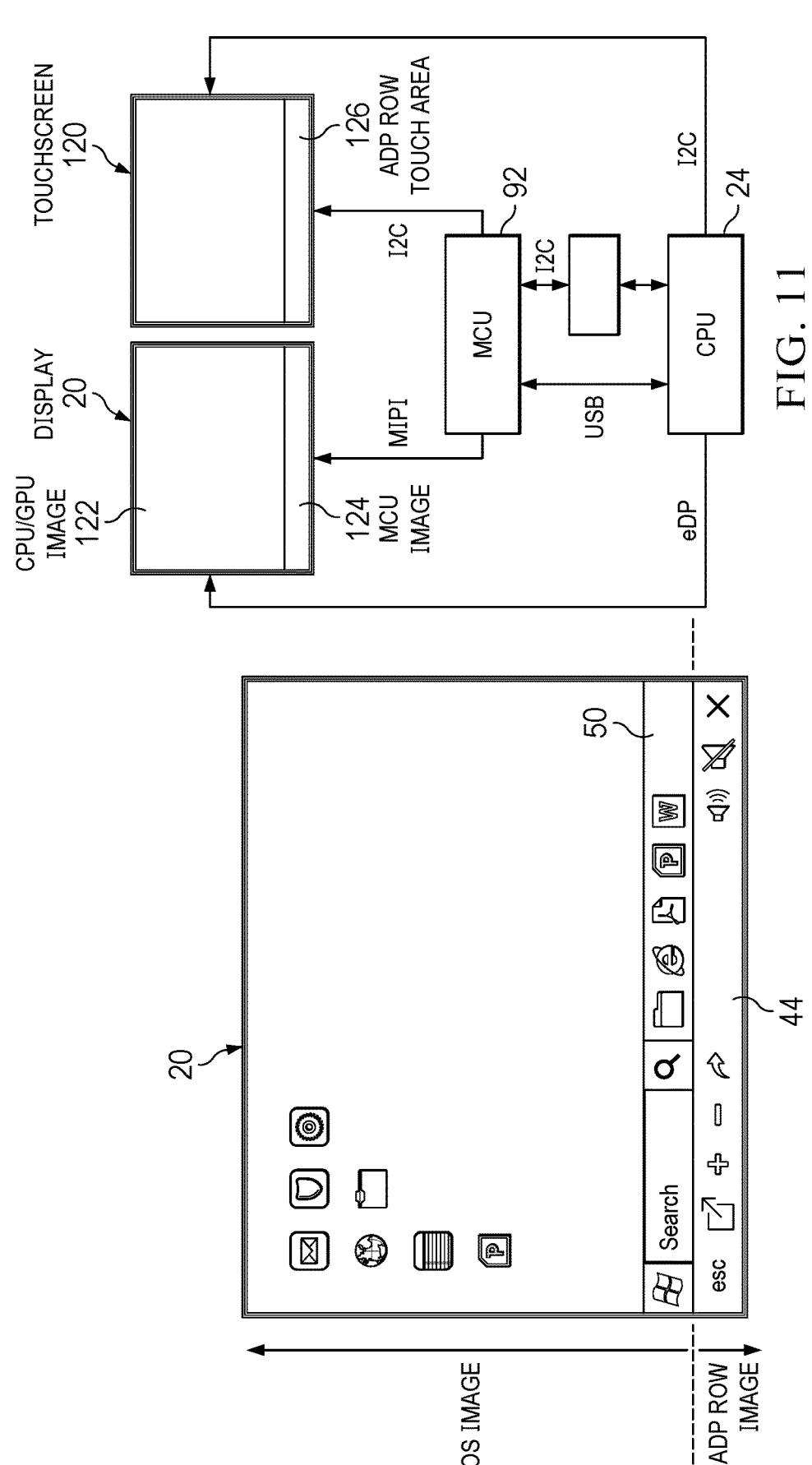
FIG. 11 depicts an example embodiment of presentation of a touch function row at a display that folds over a housing hinge to support the touch function row on the housing main portion.

Referring now to FIG. 11, an example embodiment depicts presentation of a touch function row 44 at a display 20 that folds over a housing hinge to support the touch function row on the housing main portion. Display 20 presents task bar 50 in a conventional manner with touch function row 44 presented at the bottom portion of the display where the film folds over top the housing hinge. The presentation of the touch function row 44 at display 20 is managed with a hardware solution that can also work when a separate secondary display is used. The CPU 24 and GPU of the motherboard manage the upper part 122 of the display in a conventional manner with an eDP interface, such as with the operating system and applications, while the visual images of the touch function row are presented in a lower portion 124 by a processing resource 92 of the touch function row, such as an MCU, through a MIPI interface. Similarly, the touch detection surface of display 20 has the upper portion 120 managed by CPU 24 while processing resource 92 manages the touch detection surface in a lower portion 126. This arrangement uses two separate I2C interfaces to manage touch inputs at the touch detection surface plus a USB and I2C interface to communicate between processing resource 92 and CPU 24.

Figure 12:
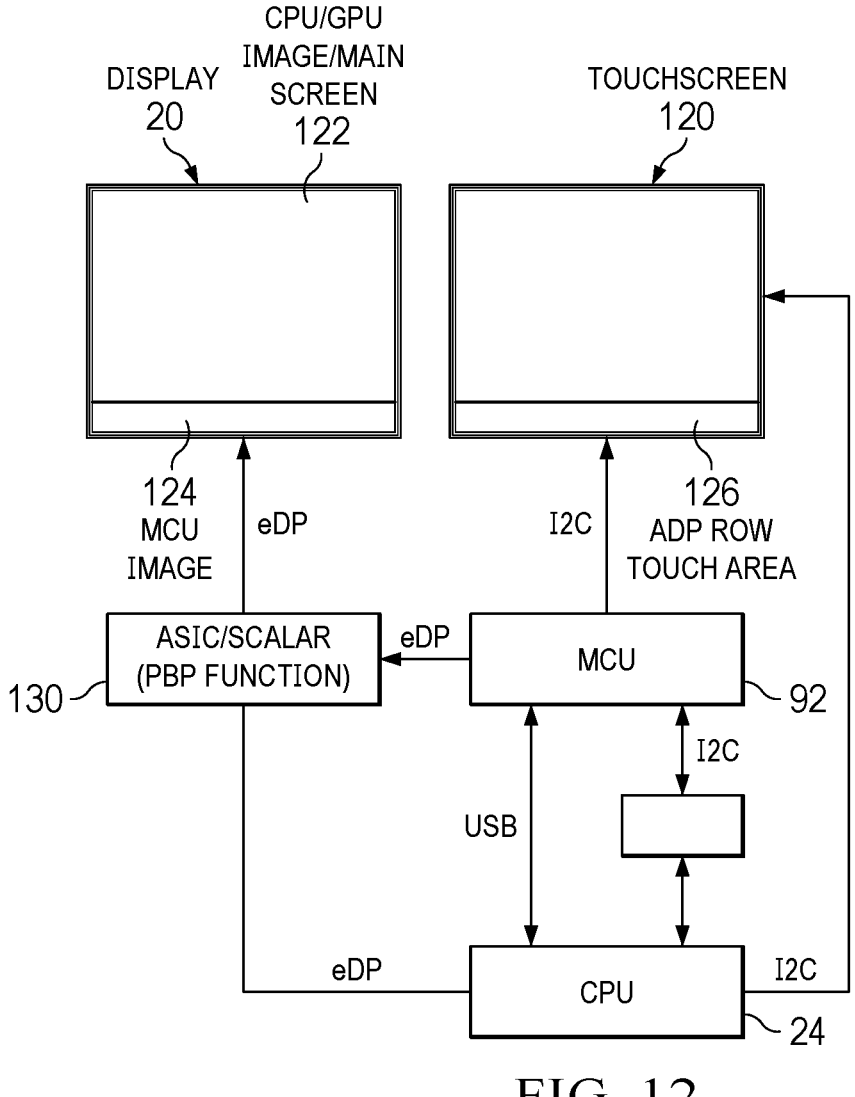
FIG. 12 depicts an alternative embodiment of presentation of a touch function row at a display that folds over a housing hinge to support the touch function row on the housing main portion by leveraging the display scalar.

Referring now to FIG. 12, an alternative embodiment depicts presentation of a touch function row 44 at a display 20 that folds over a housing hinge to support the touch function row on the housing main portion by leveraging the display scalar. In the example embodiment, scalar 130, such as an ASIC with PBP function, generates presentation of visual images for both upper portion 122 and lower portion 124 of display 20 based upon visual information provided from processing resource 92 and CPU 24 through separate eDP interfaces. The touch detection surface upper portion 120 is managed by CPU 24 and the touch detection surface lower portion 126 is managed by processing resource 92 through separate I2C interfaces. The example embodiment and that of FIG. 11 provide support for separate display and touch areas where needed and also support operations in a preboot environment when a single flexible display is used.

Figure 13:
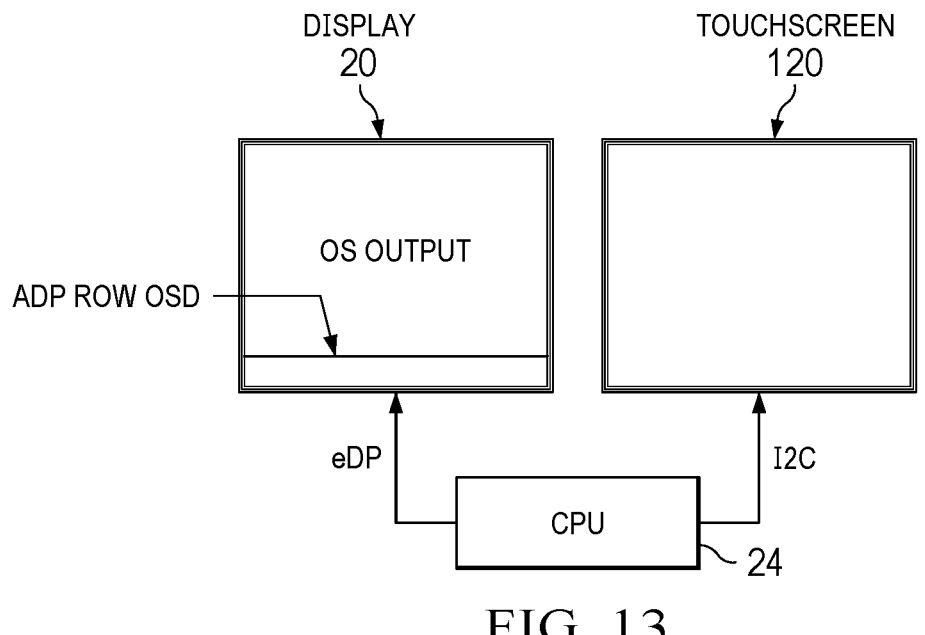
FIG. 13 depicts an alternative embodiment of presentation of a touch function row at a display that folds over a housing hinge to support the touch function row on the housing main portion by leveraging the display as a single entity.

Referring now to FIG. 13, an alternative embodiment depicts presentation of a touch function row 44 at a display 20 that folds over a housing hinge to support the touch function row on the housing main portion by leveraging the display as a single entity. Display 20 has a single display area that presents information provide by CPU 24 through a single eDP interface. CPU 24 retrieves the touch function row configuration from the embedded controller and generates the visual images based upon the defined configuration. Similarly, the touch detection is provided by a single touch detection surface 120 communicated to CPU 24 through an I2C interface. As touch inputs are detected, CPU 24 adjusts the touch function row presentation to the configured response.

Figure 14A:
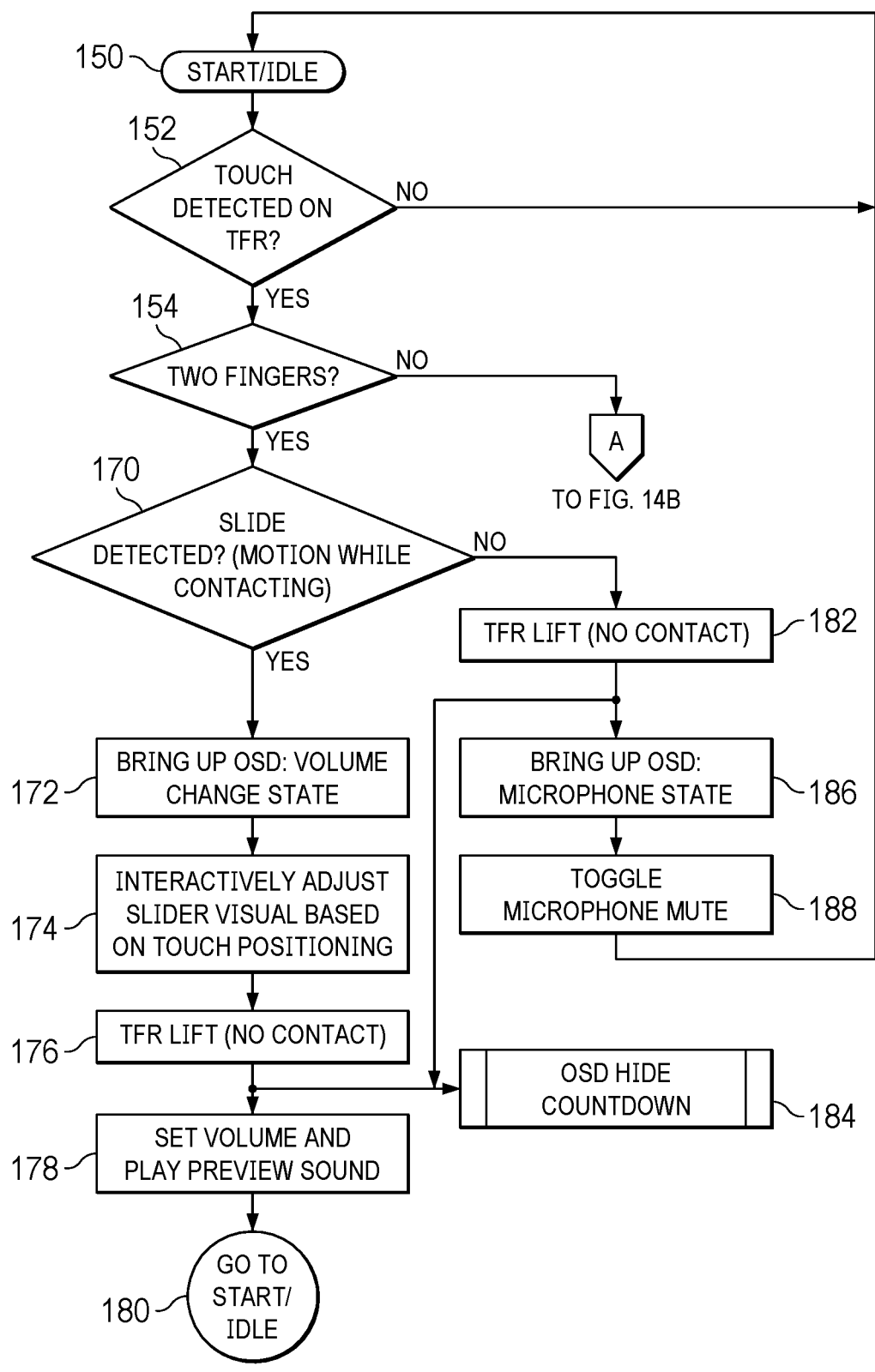
FIGS. 14A and 14B depicts a flow diagram of a process for managing inputs at a touch function row.
Figure 14B:
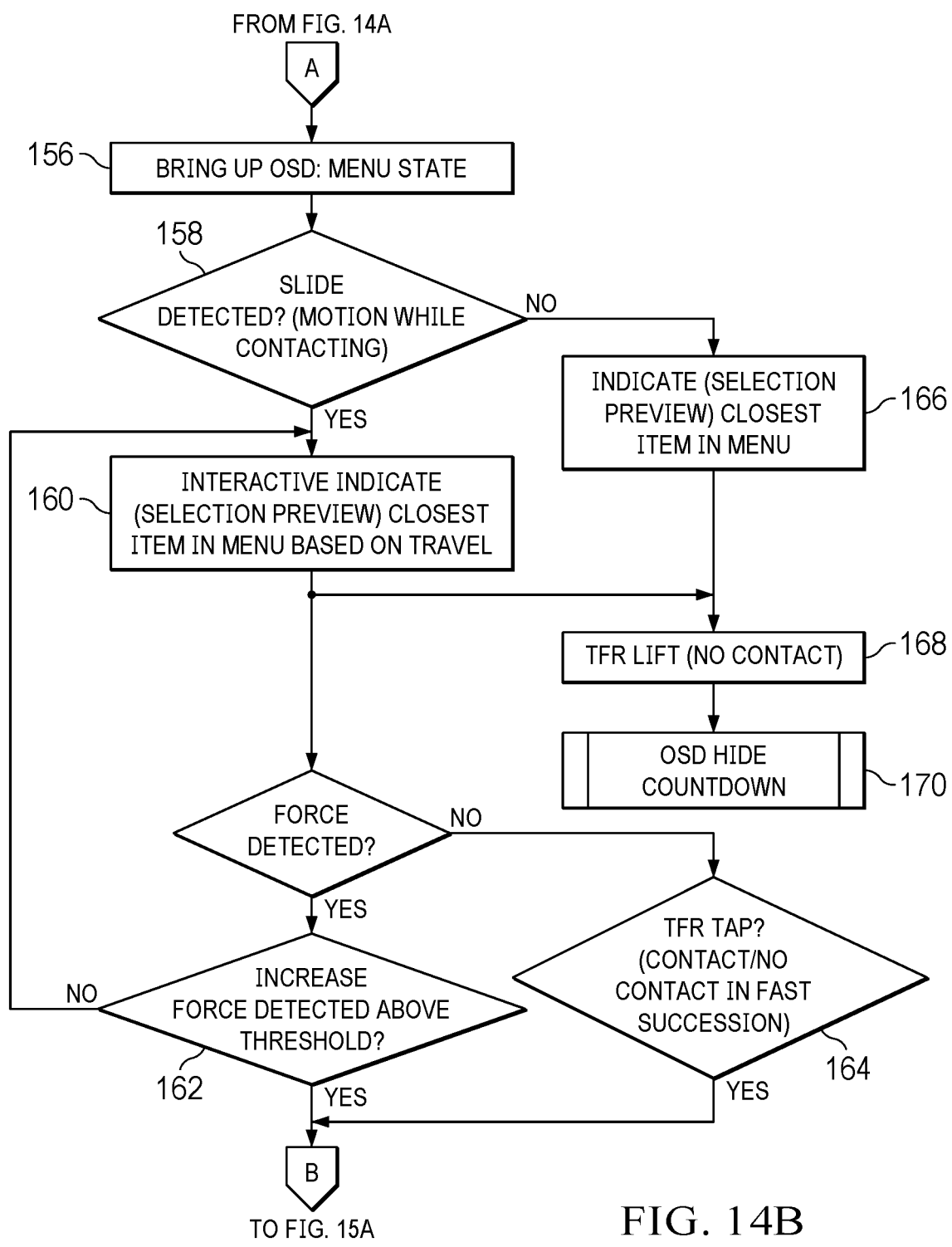

Referring now to FIGS. 14A and 14B, a flow diagram depicts a process for managing inputs at a touch function row. The process starts at step 150 from an idle state and determines at step 152 if a touch is detected at the touch function row. If not the process returns to step 150 and periodically checks for a touch at the touch function row. When a touch and/or hover is detected, the process continues to step 154 to determine if the touch involves a gesture, such as with multiple fingers. If not, the process continues to step 156 to bring up the on-screen-display user interface at a menu state that presents the functions for all of touch locations at the touch function row. At step 158, a determination is made of whether a slide motion is detected at the touch function row capacitive touch surface. If the touch and/or hover is stationary, the process continues to step 166 to highlight the function associated with the touch location detected for the touch and/or hover with a selection preview presentation for the item in the menu presented by the touch function row on-screen-display. If a sliding motion is detected, the process continues to step 160 to interactively indicate with a selection preview the closest item to the sliding finger touch/proximity. From steps 160 and 166, if the finger lifts away from the touch function row so that touch and/or proximity is no longer detected, the process continues to step 168 to indicate that no input was detected and step 170 to hide the on-screen-display user interface after no touch is detected within a countdown time period. From steps 160 and 166 the process continues to steps 162 and 164 to detect if an input is made at the touch function row. At step 162 an input is detected when a touch and/or hover is followed by a press of a predetermined pressure detect by a force detection device. At step 164 an input is detected as a tap, such as a contact followed by no contact then contact within a predetermined time. In an embodiment that relies upon hover, an input may be a hover followed by a contact. Detection of an input results in selection of the function menu item for the function icon highlighted at the time of the input, as is described in greater depth below.

At step 154 when multiple fingers are detected or other indications of a gesture input, the process continues to step 170 to determine if the multiple finger input has a sliding motion. If a sliding motion is detected, the process continues to step 172 to bring the on-screen-display user interface for speaker control onto the display, such as sound bar that the end user can interact with through the display to change speaker volume. Once the speaker volume bar is presented, the process continues to step 174 to interactively adjust the speaker volume based upon the sliding motion until at step

176 a lift of the finger is detected from the touch function row. From step 176 when no contact is detected the process continues to step 184 to countdown for removal of the on-screen-display user interface. In addition, from removal of contact at step 176 the process continues to step 178 to set the volume and play preview sound based upon the setting at contact lift and to step 150 to await the next input. When at step 170 a slide is not detected, the process continues to step 182 to determine if a lift is detected to remove contact of the multiple fingers from the touch function row. At step 184 when a lift of the contact is detected the on-screen-display user interface counts down for removal. At step 182 with removal of contact and no sliding motion, the process continues to step 186 to present the microphone function at the on-screen-display user interface and at step 188 to toggle the microphone between mute and non-mute states. The process then returns to step 150 to monitor for additional inputs. Although the example embodiment describes two finger gesture inputs at a touch function row, other types of gestures may be used. For instance, a two finger gesture may command a speaker control user interface and a three finger gesture may command a microphone control user interface. Other types of gestures may support other functions, such as drawing a circle, a rapid back and forth motion or other distinguishable inputs to command display operational menus or keyboard backlight illumination.

Figure 15A:
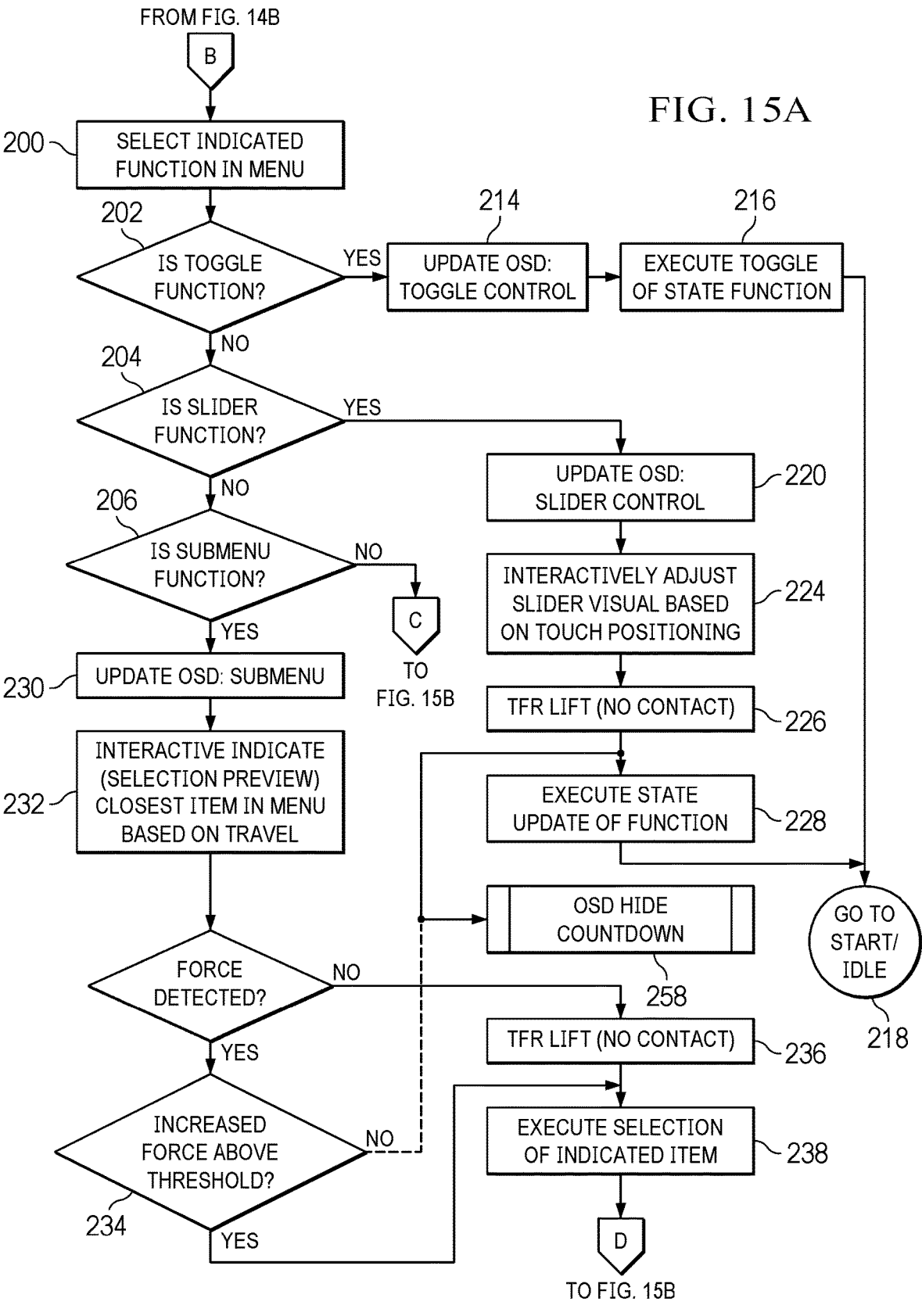
FIGS. 15A and 15B depicts a flow diagram of a process for managing a touch input at a touch function row once the on-screen-display user interface is active.
Figure 15B:
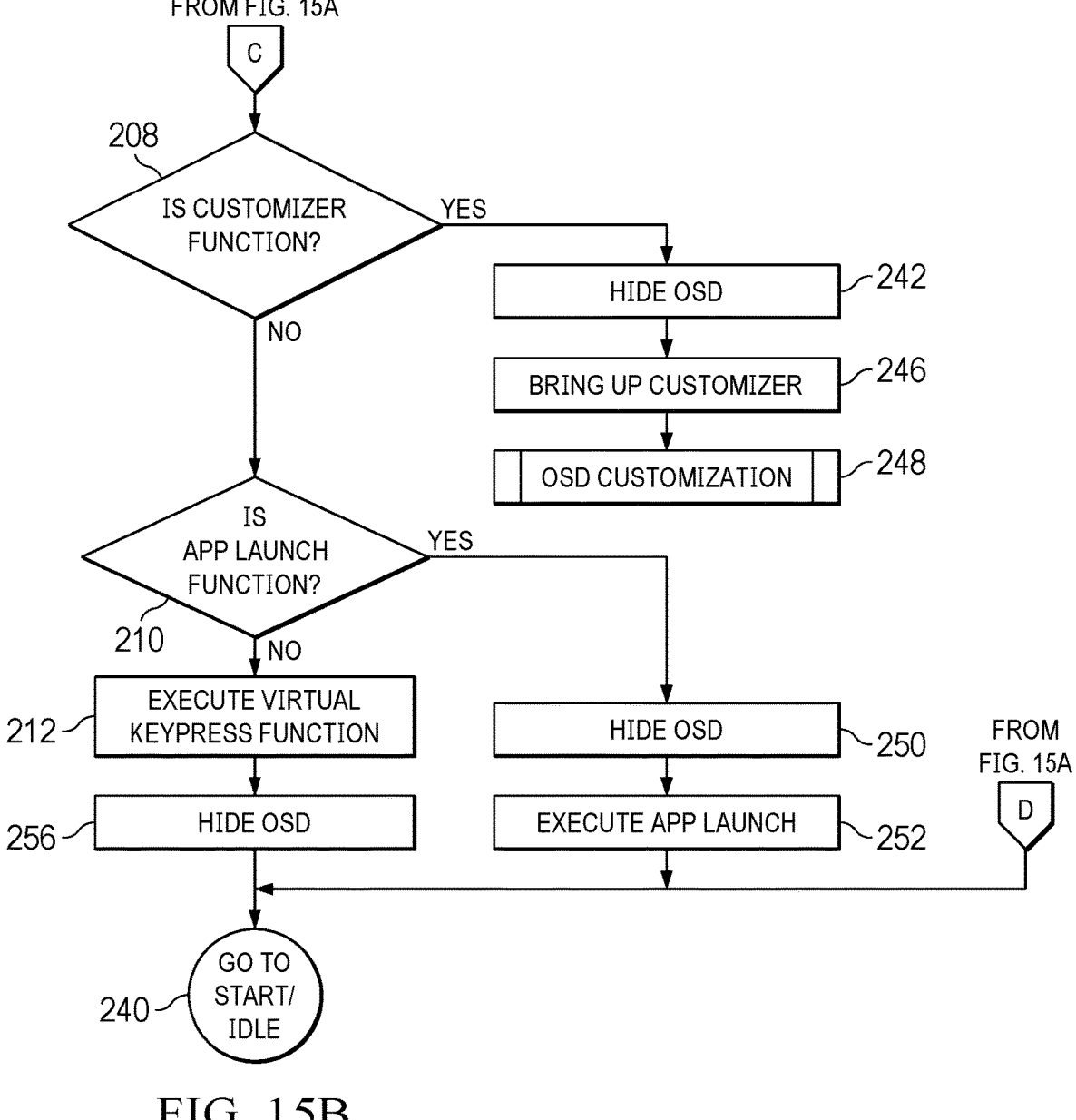

Referring now to FIGS. 15A and 15B, a flow diagram depicts a process for managing a touch input at a touch function row once the on-screen-display user interface is active. From step 162 or 164 of FIG. 14, the process starts at step 200 by selecting the indicated function in the menu of the on-screen-display user interface. At step 202 a determination is made of whether the selected function is toggle function that toggles between first and second states at each input, such as mute or audiovisual play. If the function is a toggle function, the process continues to step 214 to update the on-screen-display user interface presentation of the toggled value and to step 216 to execute the toggle command. At step 218 after the toggle command is executed, the process returns to an idle state. When the function is not a toggle function at step 202, the process continues to step 204 to determine if the function is a slider function, such as audio balance or volume. If the function has a slider function, the process continues to step 220 to update the on-screen-display slider control presentation and to step 224 to inter- actively adjust the slider visual presentation based upon the touch positioning. At step 226 when the touch function row detects a lift without contact, the slider input is stopped and the process continues to step 228 to execute the state update for the function adjusted by the slider update. From step 228, the process returns to idle at step 218 and initiates count down for on-screen-display user interface hide at step 258.

When the function is not a slider function at step 204, the process continues to step 206 to determine if the function has a submenu, such as an audiovisual presentation controller that manages presentation of a video. If a submenu function is selected, the process continues to step 230 to update the on-screen-display user interface for the submenu with pre- sentation of the submenu at the display. At step 232 the user interface interactively indicates in the submenu the com- mands of the submenu that are highlighted by touches at the touch function row. For instance, when the submenu opens at the display the touch locations are remapped to the submenu values and the submenu presentation is adjusted to show which of the touch locations is pressed on the sub- menu. At step 234 an input is accepted by increased pressure on the touch location that is detected by a force sensor.

Alternatively at step 236 an input is accepted by a lift and tap at the touch location to accept an input for the submenu item highlighted at the display at the time of the lift. At step 238 the selected submenu function is executed and the process returns to idle at step 240. When the function is not a submenu function at step 206, the process continues to step 208 to determine if a customizer function is selected, which supports the end user defining a personalized on-screen- display presentation of functions and the arrangement of the presentation of the functions, such as an order in which function key icons are presented. If yes, the process contin- ues to step 242 to hide the on-screen-display user interface and to step 246 to bring up the customize presentation for the customized function. At step 248, the process completes by performing the customizer function, such as presenting a drop and drag menu that shows all available functions and the functions that are selected from all available functions for presentation in the touch function row on-screen-display user interface. If at step 208 the function is not a customized function, the process continues to step 210 to determine if the function is to launch an application. If yes, the process continues to step 250 to hide the on-screen-display user interface and to step 252 to launch the application. If at step 210 the function is not an application launch, the process continues to step 212 to execute a virtual keypress function and step 256 to hide the on-screen-display user interface. The logic completes at step 240 by going to an idle state.

Figure 16:
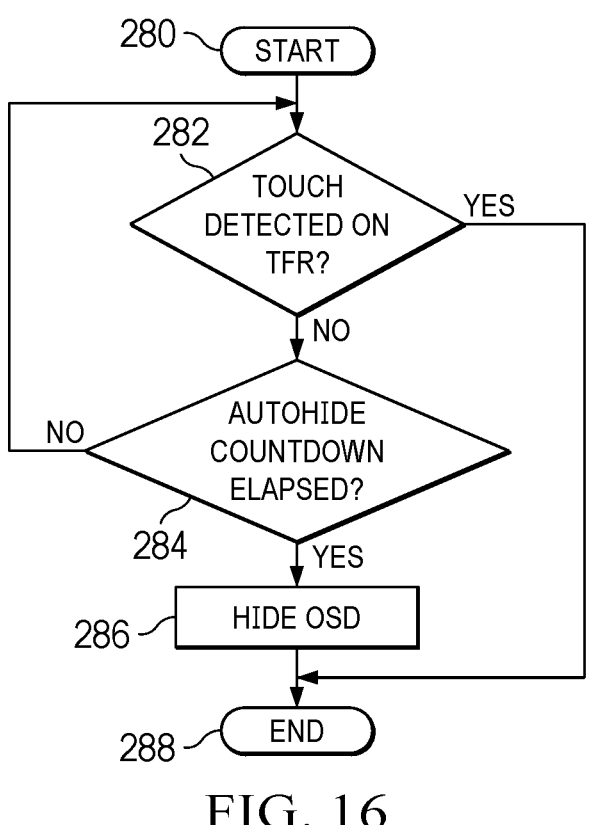
FIG. 16 depicts a flow diagram of a process for hiding a touch function row on-screen-display user interface.

Referring now to FIG. 16, a flow diagram depicts a process for hiding a touch function row on-screen-display user interface. The process starts at step 280 with the on-screen-display user interface presented at the display, such as after a touch, sliding motion or hover at the touch function row. At step 282 a determination is made of whether a touch is detected on the touch function row. If a touch is detected, the process ends at step 288. If a touch is not detected, the process continues to step 284 to determine if the autohide countdown has elapsed, such a predetermined time period. If the countdown has not elapsed, the process returns to step 280 to continue the countdown. If the countdown has elapsed, the process continues to step 286 to hide the on-screen-display user interface and to step 288 to end.

Figure 17A:
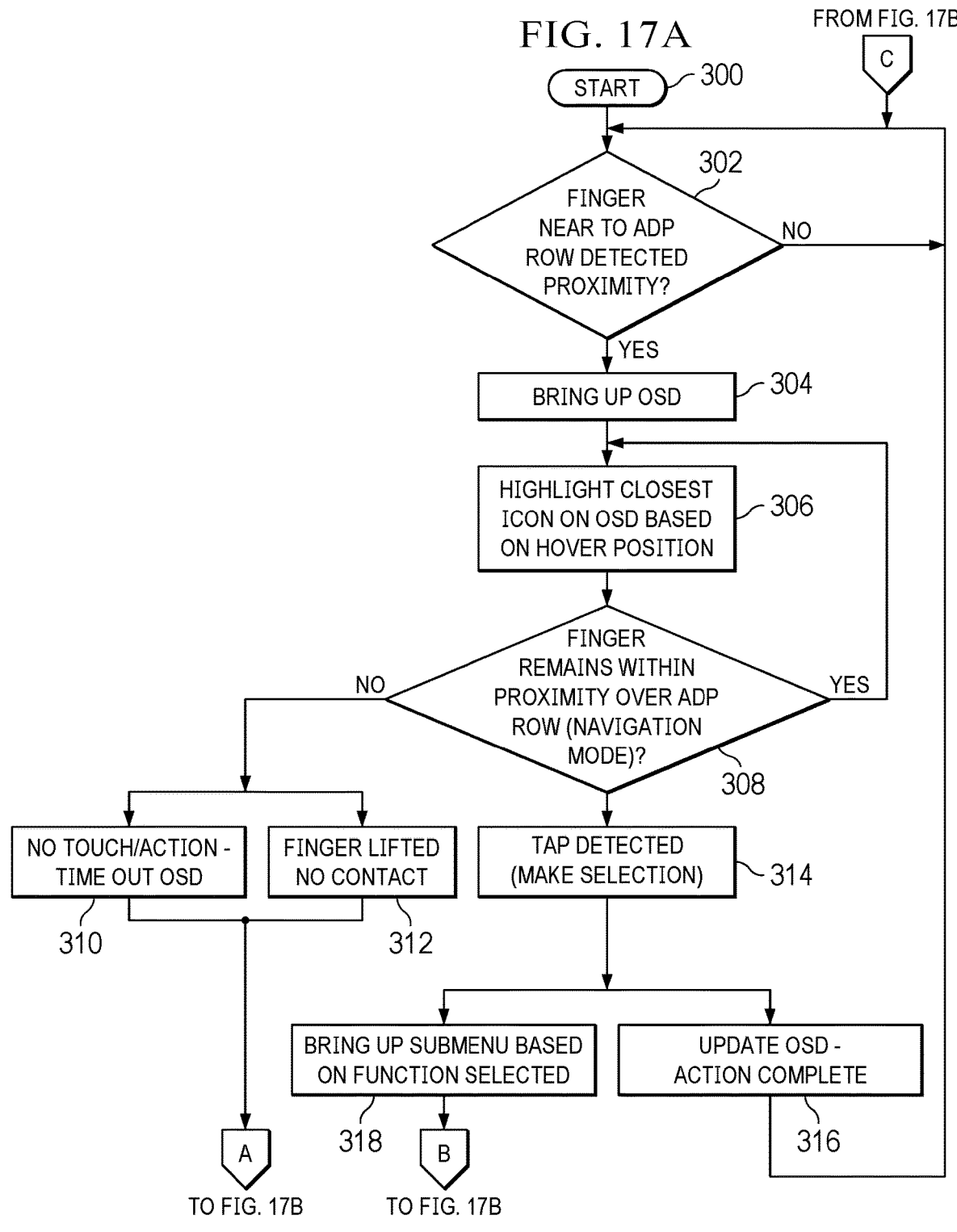
FIGS. 17A and 17B depicts a flow diagram of interactions at a touch function row having touch and/or hover interactions supported.
Figure 17B:
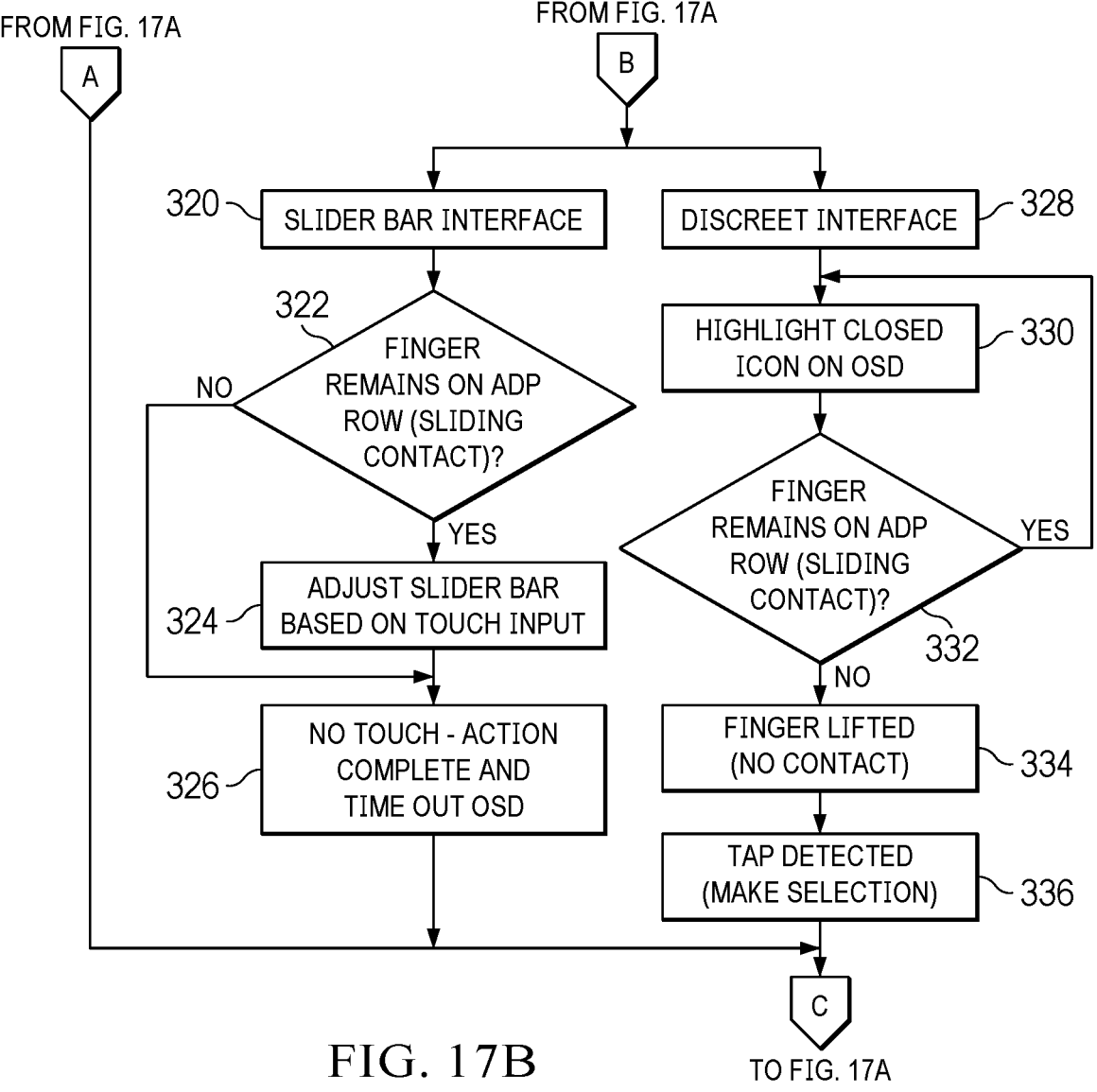

Referring now to FIGS. 17A and 17B, a flow diagram depicts interactions at a touch function row having touch and/or hover interactions supported. The process starts at step 300 and at step 302 determines if an end user finger is in proximity to the touch function row. In an alternative embodiment, actual touch may be used instead of proximity. The process returns to step 300 to monitor for proximity or touch and, when touch or proximity is detected, continues to step 304 to bring up the touch function on-screen-display user interface for presentation at the system main display or the integrated touch function row display as described above. At step 304, the touch function icon is highlighted for the touch function key value that is associated with the touch location closest to the touch or proximity detection. At step 308 a determination is made of whether the finger remains in proximity and/or contact with the touch location. If yes, the process returns to step 306 to continue monitoring for an input made by a tap from the proximity sensing or by a lift and tap by the touch sensing. Once proximity or touch is not detected and an input is not detected, the process continues to step 310 for proximity and step 312 for touch to timeout the touch function on-screen-display user interface and returns to step 300. If an input is detected by a lift and tap or by a proximity to tap, the process continues to step 314 to determine the touch function value selected. If the touch function value is a toggle input, such as a microphone or speaker mute, the process continues to step 316 to perform the toggle action and then returns to step 300.

At step 314, if the input is a submenu selection, the process to step 318 to bring up the submenu based function selection for presentation, such as slider bar or a discreet interface. If the slider bar submenu is selected, the process continues to step 320 to present the slider bar and to step 322 to determine if the finger remains on the touch detection surface of the touch function row with a sliding contact. If yes, the process continues to step 324 to adjust slider bar value based upon the touch input to the slider bar. Once the slider bar is released at step 322 or 324, the process continues to step 326 to timeout the touch function on-screen-display user interface and returns to step 300. If a discreet function is selected at step 328, the process continues to step 330 to highlight the closest touch function icon of the touch function on-screen-display user interface. At step 332 a determination is made of whether a finger remains on the touch detection surface, such as with a sliding contact or an input to the discreet function. Once the finger leaves the touch detection surface, the process continues to step 334 to detect the finger has left the contact and step 336 to detect a tap for an input. Although the discreet menu in the example embodiment uses a lift and tap, an input may be made by a force detection or proximity to tap instead. The process then returns to step 300.

Figure 18:
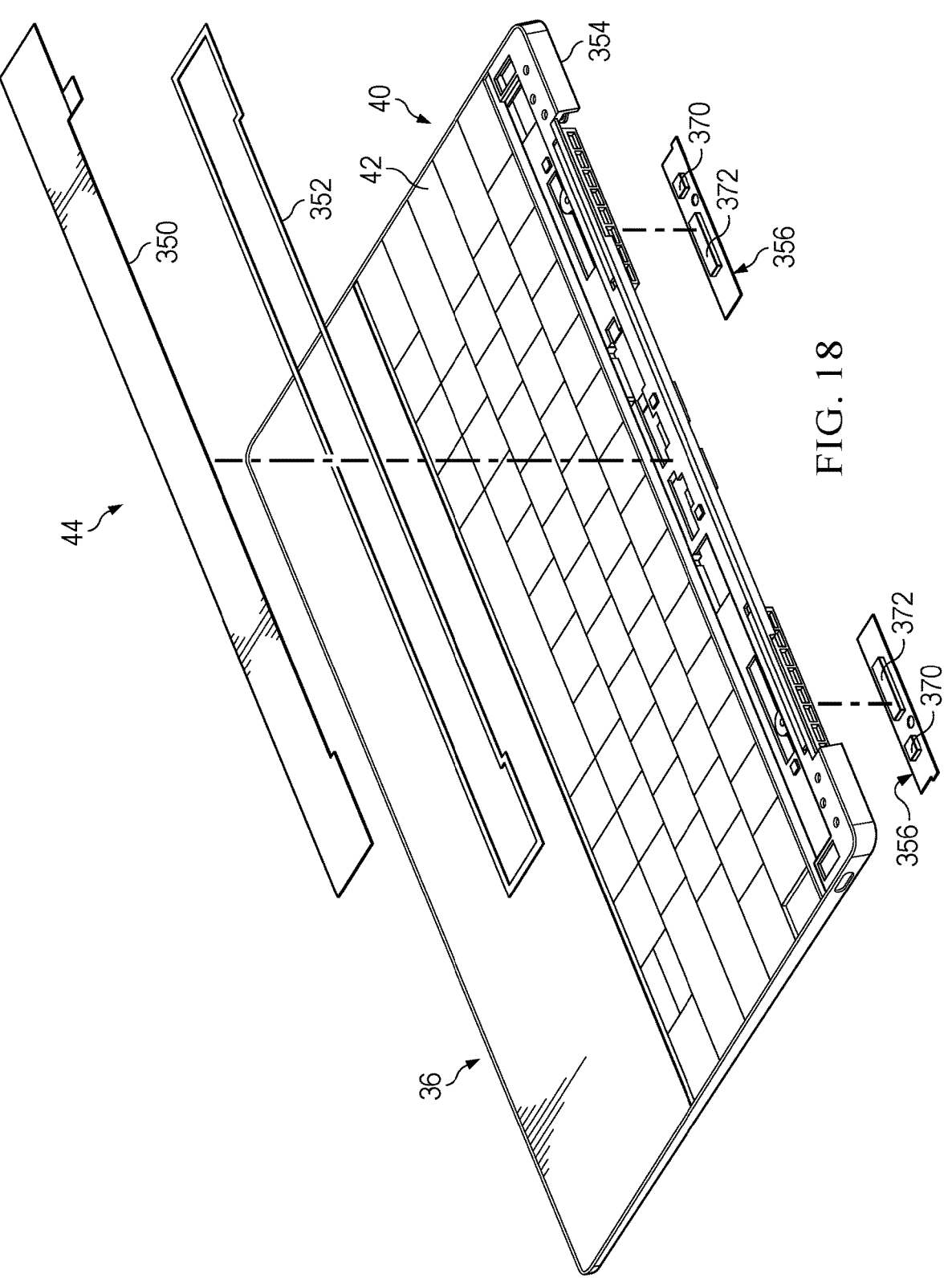
FIG. 18 depicts a keyboard having touch function row supported by haptic feedback that is isolated from the housing by integrated dampeners.

Referring now to FIG. 18, a keyboard 40 is depicted having a touch function row 44 supported by haptic feedback that is isolated from the housing cover portion 36 by integrated dampeners. Touch function row 44 couples to housing cover portion 36 between keys 42 of keyboard 40 and the front side of the housing cover portion where the hinge couples the housing lid portion. An upper touch detection surface 350 couples over a gasket 352 to a base 354 that supports the touch function row. First and second haptic device assemblies 356 couple to the bottom side of upper surface 350 and include haptic devices 370 and 372 that generate vibration, such as piezoelectric devices. When a touch input is detected at the touch function row 44, haptic feedback is provided by generating vibration with piezoelectric devices 370 and 372, which translates through to upper touch detection surface 350, as is described above.

Figure 19:
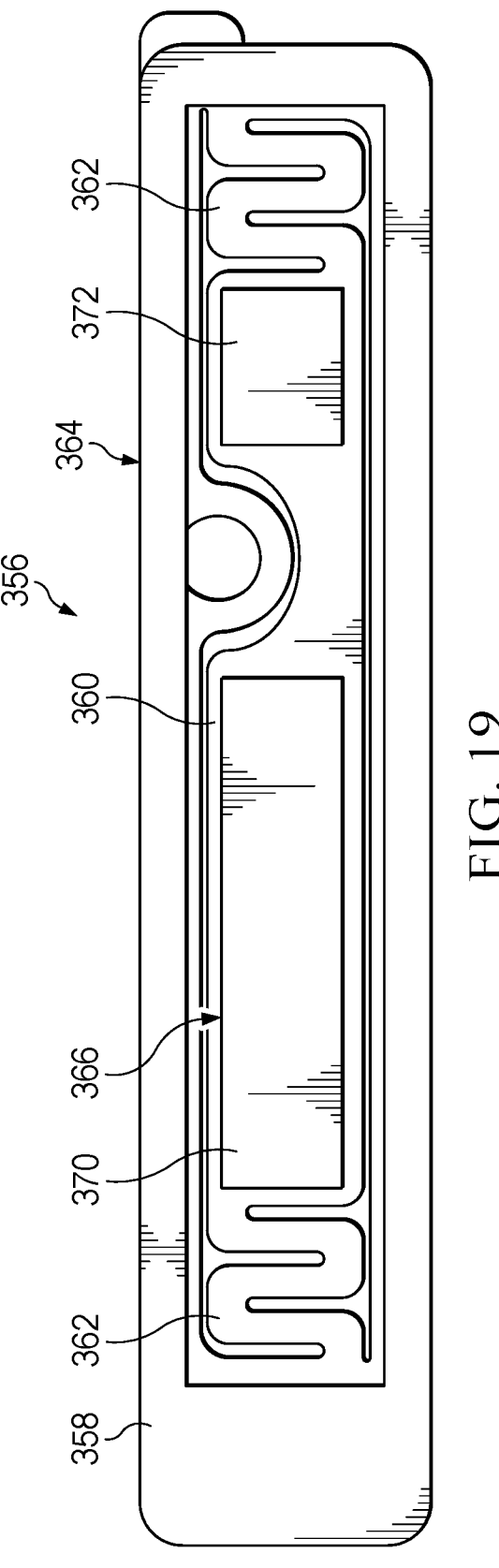
FIG. 19 depicts a top view of a haptic feedback device having vibration isolated to a touch function row and from a housing cover portion.

Referring now to FIG. 19, a top view depicts a haptic feedback device 356 having vibration isolated to a touch function row and from a housing cover portion. In the example embodiment, an adhesive 366 is applied to the upper surfaces of piezoelectric haptic devices 370 and 372 to couple directly to the upper surface of the touch function row. Adhesive 364 is also applied to an outer perimeter 358 of haptic device 356 so that a support plate 360 holding the haptic devices 370 and 372 is captured between the touch function row and housing cover portion with a resilient spring member 362 on each side of support plate 360. As a result, vibration from haptic devices 370 and 372 translates directly to the upper contact surface of the touch function row and is dampened relative to the housing cover portion. The lateral location of the resilient member minimizes the vertical size of the haptic device assembly. In one example embodiment, support plate 360 is cut from stainless steel material. In alternative embodiments, other types of material may be used so that the spring shape of resilient spring member 362 has a desired dampening effect.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having a main portion and a lid portion rotationally coupled by a hinge;
   a processor disposed in the housing main portion and operable to execute instructions that process information;
   a memory disposed in the housing main portion and interfaced with the processor, the memory operable to store the instructions and information;
   a display coupled in the housing lid portion and interfaced with the processor, the display operable to present the information as visual images, the display extending over the housing lid portion and across the hinge to a touch function row that accepts function key inputs with capacitive touch detection;
   a keyboard coupled to the housing main portion, the keyboard having plural mechanical keys configured to travel vertically to accept end user inputs; and
   a non-transitory memory interfaced with the processor and storing instructions that when executed cause:
   detection of a two finger touch at touch locations at the touch function row, the touch having a sliding motion;
   in response to the two finger touch and sliding motion, presenting a speaker control user interface at the flexible display lid portion;
   detection of the two finger touch without the sliding motion followed by a lift; and
   in response to the two finger touch without the sliding motion, presentation at the display in the housing lid portion of microphone control user interface with a toggle of a microphone mute setting at the lift.

2. The information handling system of claim 1 wherein the instructions further:
   detect a lift of the touch from the sliding motion at the touch function row followed by a tap within a predetermined time as the input indication; and
   the tap is applied as selection of the function presented at the display at the time of the lift.

3. The information handling system of claim 1 wherein the instructions further:
   detect a first pressure of the touch during the sliding motion at the touch function row followed by a second pressure of greater than the first pressure at completion of the sliding; and
   apply the second pressure as the input indication for selection of the function presented at the display at the time of the second pressure.

4. The information handling system of claim 1 wherein the instructions further:
   detect an end user proximity touch at a touch proximity location when an end user finger hovers over the touch function row without touching the touch function row; and
   in response to detection of the hover, present the touch function at the display of the touch proximity location.

5. The information handling system of claim 4 wherein the instructions further:
   detect a pause of the end user hover at the touch proximity location of the touch function row; and
   in response to the pause, present an expanded function on-screen-display at the first display for a function associated with the touch proximity location.

6. The information handling system of claim 1 wherein the instructions further:

detect the sliding motion followed by a swipe up from a touch location of the touch function row, the swipe up providing the input indication; and in response to the swipe up, present an expanded function on-screen-display at the display in the housing lid portion for a function associated with the touch location.

7. The information handling system of claim 6 wherein the instructions further:

present the expanded function on-screen-display of audio speaker controls including at least a volume control; and a slide at the touch function row adjusts the volume control while the audio speaker controls are presented.

8. The information handling system of claim 1 wherein the functions include at least function key inputs F1 through F9.

9. The information handling system of claim 8 wherein the functions include escape, the touch function row presenting the escape function without F1 through F9 until end user proximity to the touch function row is detected.

10. A method for interacting with an information handling system, the method comprising:

coupling a flexible display to an information handling system housing lid portion, across a hinge, and over a portion of the information handling system housing main portion adjacent a mechanical keyboard;

defining a touch function row on the flexible display between the keyboard and the hinge;

detecting a two finger touch with a sliding motion at touch locations of the touch function row;

in response to the two finger touch with the sliding motion, presenting at the flexible display in the lid portion a speaker control user interface upon detection of a lift of the two finger touch;

detecting a two finger touch without a sliding motion; and in response to the detecting, presenting at the flexible display a microphone control user interface and toggling a microphone mute setting.

11. The method of claim 10 further comprising:

detecting proximity of an end user finger to the touch function row without a touch for a predetermined time; and applying the proximity as a selection of the function presented at the flexible display in response to the proximity.

12. The method of claim 10 further comprising:

detecting a lift of the touch from the sliding motion at the touch function row followed by a tap at the touch function row within a predetermined time as the input indication; and applying the tap as selection of the function presented at the flexible display at the time of the lift.

13. The method of claim 10 further comprising:

detecting a first pressure of the touch during the sliding motion at the touch function row followed by a second pressure of greater than the first pressure at completion of the sliding; and applying the second pressure as the input indication for selection of the function presented at the display at the time of the second pressure.

14. The method of claim 10 further comprising:

detecting the sliding motion followed by a swipe up from the touch location of the touch function row, the swipe up providing the input indication; and in response to the swipe up, presenting an expanded function on-screen-display user interface at the flexible display in the housing lid portion for a function associated with the touch location.

15. The method of claim 14 further comprising:

presenting the expanded function on-screen-display user interface of audio speaker controls including at least a volume control;

detecting a slide at the touch function row; and adjusting the volume control while the audio speaker controls are presented.

16. The method of claim 12 further comprising:

presenting a subset of the functions at the touch function row to include at least an escape key and exclude F1 through F9 keys; and presenting the F1 through F9 keys when a touch is detected at the touch function row.

17. A system for selecting function features at an information handling system, the system comprising:

a housing having a lid portion rotationally coupled to a main portion by a hinge;

a keyboard coupled to the main portion and having mechanical keys with vertical travel;

a flexible display coupled to the lid portion and extending across the hinge to the main portion adjacent the keyboard; and a non-transitory memory storing instructions that when executed on a processing resource cause:

presentation of a touch function row at the flexible display between the keyboard and the hinge to accept function key inputs with capacitive touch detection;

detection of a two finger touch at the touch function row;

when the two finger touch includes detection of a sliding motion at the touch function row, then in response presentation at the flexible display in the lid portion of a speaker control user interface upon detection of a lift of the two finger touch;

when the two finger touch does not include a sliding motion, then in response presentation at the flexible display in the lid portion of a microphone control user interface upon detection of a lift of the two finger touch and toggling of the microphone mute setting; and in response to the lift, initiation of a countdown to remove whichever of the speaker control user interface or the microphone control user interface that is presented at the display.

18. The system of claim 17 wherein the instructions further:

detect an end user proximity touch at a touch proximity location when an end user finger hovers over the touch function row without touching the touch function row; and in response to detection of the hover, present the touch function at the display of the touch proximity location.

19. The system of claim 18 wherein the instructions further:

detect a pause of the end user hover at a touch proximity location of the touch function row; and in response to the pause, presentation of an expanded function on-screen-display at the first display for a function associated with the touch proximity location.

20. The system of claim 17 wherein the functions include at least function key inputs F1 through F9.

* * * * *